(12) United States Patent
Sudhaus

(10) Patent No.: US 10,136,496 B2
(45) Date of Patent: Nov. 20, 2018

(54) APPARATUS FOR SUPPLYING ELECTRICAL ENERGY TO A CONSUMER

(71) Applicant: Elmos Semiconductor AG, Dortmund (DE)

(72) Inventor: Andre Sudhaus, Recklinghausen (DE)

(73) Assignee: Elmos Semiconductor AG, Dortmund (DE)

( * ) Notice: Subject to any disclaimer, the term of this patent is extended or adjusted under 35 U.S.C. 154(b) by 143 days.

(21) Appl. No.: 14/914,270

(22) PCT Filed: Aug. 27, 2014

(86) PCT No.: PCT/EP2014/068176
§ 371 (c)(1),
(2) Date: Feb. 25, 2016

(87) PCT Pub. No.: WO2015/028511
PCT Pub. Date: Mar. 5, 2015

(65) Prior Publication Data
US 2016/0219670 A1 Jul. 28, 2016

(30) Foreign Application Priority Data

Aug. 28, 2013 (DE) .................. 10 2013 014 661
Jan. 31, 2014 (EP) .................... 14153428
Apr. 10, 2014 (EP) .................... 14164254

(51) Int. Cl.
*B60R 16/03* (2006.01)
*H05B 33/08* (2006.01)
*B60Q 11/00* (2006.01)

(52) U.S. Cl.
CPC ......... *H05B 33/0857* (2013.01); *B60Q 11/00* (2013.01); *B60R 16/03* (2013.01);
(Continued)

(58) Field of Classification Search
CPC ............... B60R 16/03; H05B 33/0803; H05B 33/0806; H05B 33/0809; H05B 33/0812;
(Continued)

(56) References Cited

U.S. PATENT DOCUMENTS 5,936,317 A * 8/1999 Sasanouchi ........... H02J 7/0031
307/10.1
6,281,631 B1 * 8/2001 Schaffer .................. B60Q 11/00
307/10.8
(Continued)

FOREIGN PATENT DOCUMENTS

DE 102007001716 A1 7/2008
DE 102010005907 A1 7/2011
(Continued)

OTHER PUBLICATIONS

International Search Report and Written Opinion for PCT/EP2014/068176 dated Nov. 24, 2014 (with English translation; 15 pages).
(Continued)

*Primary Examiner* — Levi Gannon
(74) *Attorney, Agent, or Firm* — Bejin Bieneman PLC

(57) ABSTRACT

The apparatus for supplying at least one consumer with electrical energy or for providing electrical power for at least one consumer from an on-board motor vehicle electrical system is provided with a control circuit, which is designed as an IC and has an input by means of which electrical energy can be supplied to the control circuit from the on-board motor vehicle electrical system, and having at least a first output and a second output, wherein a consumer can be supplied with electrical energy from the on-board motor vehicle electrical system by the control circuit by means of each of said two outputs, or the control circuit can provide electrical power for a consumer by means of said outputs, at least one external resistor, which is arranged outside the IC, for emitting possible lost electrical power outside the IC,
(Continued)

wherein firstly the external resistor is connected to the second output of the control circuit, and secondly the consumer can be connected to the external resistor. The setpoint value for the electrical power of the consumer, which electrical power can be controlled by the control circuit, can be specified. Distributing the electrical energy for the consumer or the electrical power which is provided for said consumer between the at least two outputs of the control circuit can be controlled by said control circuit depending on at least one distribution parameter. Said distribution parameter can be supplied to the control circuit or determined in the control circuit.

20 Claims, 20 Drawing Sheets

(52) U.S. Cl.
CPC ..... *H05B 33/0809* (2013.01); *H05B 33/0812* (2013.01); *H05B 33/0824* (2013.01); *H05B 33/0842* (2013.01); *Y02B 20/343* (2013.01)

(58) Field of Classification Search
CPC .............. H05B 33/0824; H05B 33/083; H05B 33/0842; H05B 33/0896; H05B 37/02
USPC ................................................ 307/10.1, 10.8
See application file for complete search history.

(56) References Cited

U.S. PATENT DOCUMENTS

| | | | | |
|---|---|---|---|---|
| 6,566,816 B2 * | 5/2003 | Fushimi | ............... | B60Q 1/1407 307/10.8 |
| 6,583,570 B1 * | 6/2003 | Ito | ............... | B60Q 1/1415 307/10.8 |
| 6,791,273 B2 * | 9/2004 | Ito | ............... | H05B 41/38 307/10.8 |
| 8,120,201 B2 * | 2/2012 | Fujino | ............... | H02M 3/33507 307/10.8 |
| 8,786,129 B2 * | 7/2014 | Sakuma | ............... | H05B 33/0827 307/10.8 |
| 2003/0227257 A1 | 12/2003 | Serizawa et al. | | |
| 2004/0155844 A1 * | 8/2004 | Stopa | ............... | H05B 33/0815 345/82 |
| 2005/0062445 A1 | 3/2005 | Toyota et al. | | |
| 2007/0085494 A1 * | 4/2007 | Takeda | ............... | H05B 33/0815 315/316 |
| 2009/0033243 A1 | 2/2009 | Gater | | |
| 2012/0212133 A1 * | 8/2012 | Langkabel | ............... | B60Q 1/0023 315/77 |
| 2013/0049597 A1 | 2/2013 | Pan | | |
| 2013/0049622 A1 | 2/2013 | Angeles | | |
| 2013/0169153 A1 * | 7/2013 | Meeks | ............... | B60R 25/00 315/77 |
| 2013/0241417 A1 * | 9/2013 | Sakuma | ............... | H05B 37/034 315/131 |

FOREIGN PATENT DOCUMENTS

| | | |
|---|---|---|
| EP | 2196887 A1 | 6/2010 |
| EP | 2416623 A2 | 2/2012 |
| EP | 2645818 A | 10/2013 |
| JP | S60107372 A | 6/1985 |
| WO | 2009035948 A1 | 3/2009 |

OTHER PUBLICATIONS

International Preliminary Report on Patentability for PCT/EP2014/068176 dated Mar. 3, 2016 (7 pages).

* cited by examiner

APPARATUS FOR SUPPLYING ELECTRICAL ENERGY TO A CONSUMER

CROSS-REFERENCE TO RELATED APPLICATIONS

This application is a national stage of, and claims priority to, Patent Cooperation Treaty Application No. PCT/EP2014/068176, filed on Aug. 27, 2014, which claims priority to German Application No. DE 10 2013 014 661.5 filed on Aug. 28, 2013, EP Application No. EP14153428.9 filed on Jan. 31, 2014, and EP Application No. EP14164254.6 filed on Apr. 10, 2014, each of which applications are hereby incorporated herein by reference in their entireties.

BACKGROUND

The disclosure relates to an apparatus for supplying at least one consumer with electrical energy or for providing electrical power for at least one consumer.

For many applications, controlled supply of electrical energy is necessary. Particularly in the controlling of the supply to LED lights in automobiles, special requirements have to be fulfilled.

The LEDs which have to be energized are typically connected in series, less frequently in parallel, and are typically powered by a current source. This controlled current source is powered by an energy source, typically by the on-board network of an automobile.

Herein, the problem occurs that the controlling of the current source leads to a considerable power loss within in the current source circuit. This has consequences to the effect that, in monolithic integration in the form of an integrated circuit (IC), additional IC area become necessary so as not to exceed the critical temperature for the respective semiconductor. At the same time, it is possible that special measures are required for cooling within the housing of the current source.

In EP-A-2 645 818, which is a publication of a European Patent Application with a filing date before the priority day of the present PCT application and whose publication was performed only after the priority date of the present PCT application, there is described a driver circuit for serial LED circuits that is energized by an alternating voltage source (AC voltage source).

Further LED driver circuits, part of them provided with current control units, are known from EP-A-2 416 623, WO-A-2009/035948, US-A-2013/0049622 and JP-60 107372.

SUMMARY

It is an object of the disclosure to minimize the power loss for the current source itself as caused by the controlling of the LED current through the supplying current source, so that the expenditure of integrated circuit (IC) area and the technical expenditure for the housing are considerably reduced.

The above object is achieved by an apparatus as described below.

An apparatus is disclosed for, in addition to controlling a current, identifying a site where a power loss caused by the current control is occurring. An additional control parameter specifies a site where an additional power loss is generated.

The disclosure is founded on the recognition that, basically, a transistor which is the controlling transistor of a current source, can in the broadest sense be considered as an adjustable resistor. If this transistor has a medium resistance value, a maximum of power will drop across the transistor.

For the above reason, it is possible to define an operating range in which this transistor can be replaced by another, second transistor that has an external resistor connected downstream of it. This second transistor will then control the current, wherein a part of the power loss will occur not in the second transistor itself but in said external resistor. Thus, the integrated circuit will heat up to a lesser extent because a portion of the heat will be dissipated in the external resistor. When a current is required that necessitates a transistor resistance below the sum of the on-resistance of the second transistor and the external resistance, the first transistor will take over the controlling again.

This principle can be generalized in as far as the current within two current paths is controlled by two parameters at each time in such a manner that the sum of the currents in the two current paths will correlate with a first parameter and the distribution of the power loss is linked to a second, additional parameter.

Of course, this principle can also be applied to more than two current paths. In this case, the controlling between the current paths can be performed both in a two- or multidimensional manner.

Thus, according to the disclosure, the apparatus for supplying at least one consumer with electrical energy or for providing electrical power for at least one consumer from an on-board motor vehicle electrical system, is provided with
  a control circuit designed as an integrated circuit (IC) and having an input by means of which electrical energy can be supplied to the control circuit from the on-board motor vehicle electrical system, and having at least a first output and a second output, wherein a consumer can be powered with electrical energy from the on-board motor vehicle electrical system by the control circuit via each of said two outputs, or the control circuit can provide electrical power for a consumer by means of said outputs,
  at least one external resistor arranged outside the IC, for emitting possible lost electrical power outside the IC, wherein firstly the external resistor is connected to the second output of the control circuit, and secondly the consumer can be connected to the external resistor,
  wherein the desired value for the electrical power of the consumer, which electrical power can be controlled by the control circuit, can be specified, and
  wherein the distribution of the electrical energy for the consumer or the electrical power provided for said consumer between the at least two outputs of the control circuit can be controlled by said control circuit depending on at least one distribution parameter, which distribution parameter can be supplied to the control circuit or be determined in the control circuit.

It should be noted that a possible power loss which may occur in the control circuit can be converted—via an external resistor or other consumer—in the form of heat which then will be dissipated into the ambient environment. Thereby, the control circuit designed as an IC is protected from thermal overstress. For this purpose, the control circuit delivers to the consumer, via at least two paths, the respective energy or power "ordered" by the consumer from a voltage source, particularly from a direct current source such as e.g. the on-board network of an automobile. One of said paths is connected to the control circuit in a manner as low-ohmic as possible, i.e. substantially without losses, notably via the above mentioned first output of the control circuit, whereas the second power transmission path comprises the external resistor. By means of two control modules, these two power paths will now be controlled in a corresponding manner, wherein, up to a first limit value, the electrical power will be transmitted from the control circuit to the consumer exclusively via the first output. In each control module, there is also generated a power loss in the form of heat, notably to an extent that depends on the magnitude of the electrical power to be made available to the consumer. Depending on the respective operating point where the at least one driver of a control module is situated, the control module will thus generate more or less heat. Therefore, if the driver due to an increased power demand of the consumer would get into an operating range in which it would generate a higher power loss, which in the form of heat could affect the IC, it is provided that the next control module will be additionally connected to the consumer for additional power output.

Distribution of the available electrical power between the control modules will occur in dependence on the distribution parameters.

Thus, the approach according to the disclosure is distinguished from the methods known from the state of the art where, for avoidance of overheating of driver transistors, the current to be supplied to the load or to a consumer will be distributed between a plurality of drivers in a symmetrical or uniform manner, as described e.g. in EP-A-2 196 887.

The disclosed apparatus is particularly suited for electrical energy supply to at least one electric/electronic consumer such as e.g. an electromechanical, electro-optical or electro-acoustic consumer, especially an illuminant such e.g. an LED, or a consumer having an optionally parasitic ohmic and/or inductive and/or capacitive load, as found in as found in electrical/electronic devices/components in the automotive sector and/or of daily life e.g. for residential and/or industrial buildings, accessories, transport. An example of an ohmic load is an automobile auxiliary heater; in case of an inductive load, it can be e.g. a generator or motor, e.g. a brushless DC (BLDC), a step motor, single- or multi-phase motor, lifting magnets, while, as an example of a capacitive load, a supercapacitor can be mentioned, e.g. for storage of electrical energy.

SUMMARY OF THE DRAWINGS

The disclosed apparatus will be explained in greater detail hereunder by way of several examples and with reference to the drawings. In the individual Figures, the following is illustrated.

EXAMPLES

The Figures explained hereunder represent only several possible configurations of an apparatus for supplying electrical energy to a consumer and managing a distribution of heat loss. Other configurations are evident from the above description and from the claims.

Figure 1:
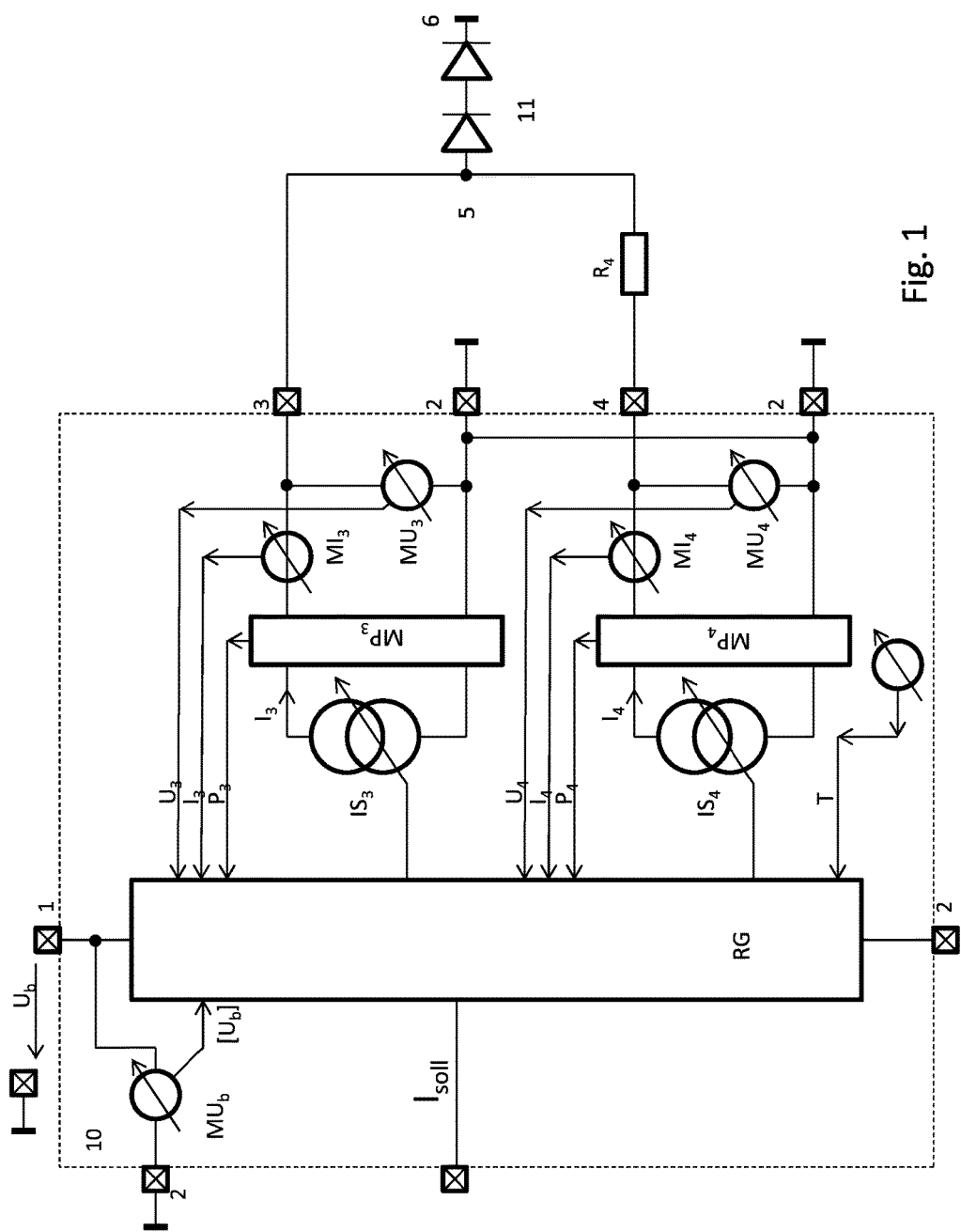
FIG. 1 shows an exemplary basic structure of an apparatus 10 with a single LED chain 11 as consumers.

FIG. 1 shows an exemplary control circuit 10. Said control comprises two outputs 3, 4 and, for each of these outputs 3, 4, an associated current source $IS_3$, $IS_4$ controlled by a controller RG. The current of the first current source $IS_3$ is conducted directly into the first connector 5 of the consumer 11, the latter in this case being an LED chain. The current of the second current source $IS_4$ is conducted via the resistor $R_4$ and will cause a voltage drop there. The output voltages $U_3$, $U_4$ are detected by measurement devices $MU_3$, $MU_4$ and are fed to controller RG as measurement values. Likewise, the currents $I_3$, $I_4$ are detected by two further measurement devices $MI_3$, $MI_4$ and again are fed to controller RG as measurement values. The powers $P_3$, $P_4$ are detected by power measurement devices $MP_3$, $MP_4$ and fed to controller RG as measurement values.

Likewise, the operating voltage $U_b$ is detected by a measurement device $MU_b$ and fed to controller RG as a measurement value. Not all of these measurement values are required for a successful realization. Here, it is merely intended to illustrate the potential. A temperature measurement device will measure the temperature T and make it available to controller RG. Controller RG is operative to control the current sources $IS_3$, $IS_4$ with the aid of these measurement values and optionally with the aid of control instructions received from external sources, here a desired value $I_{soll}$, and with the aid of magnitudes that have been optionally stored and/or derived therefrom.

Figure 2:
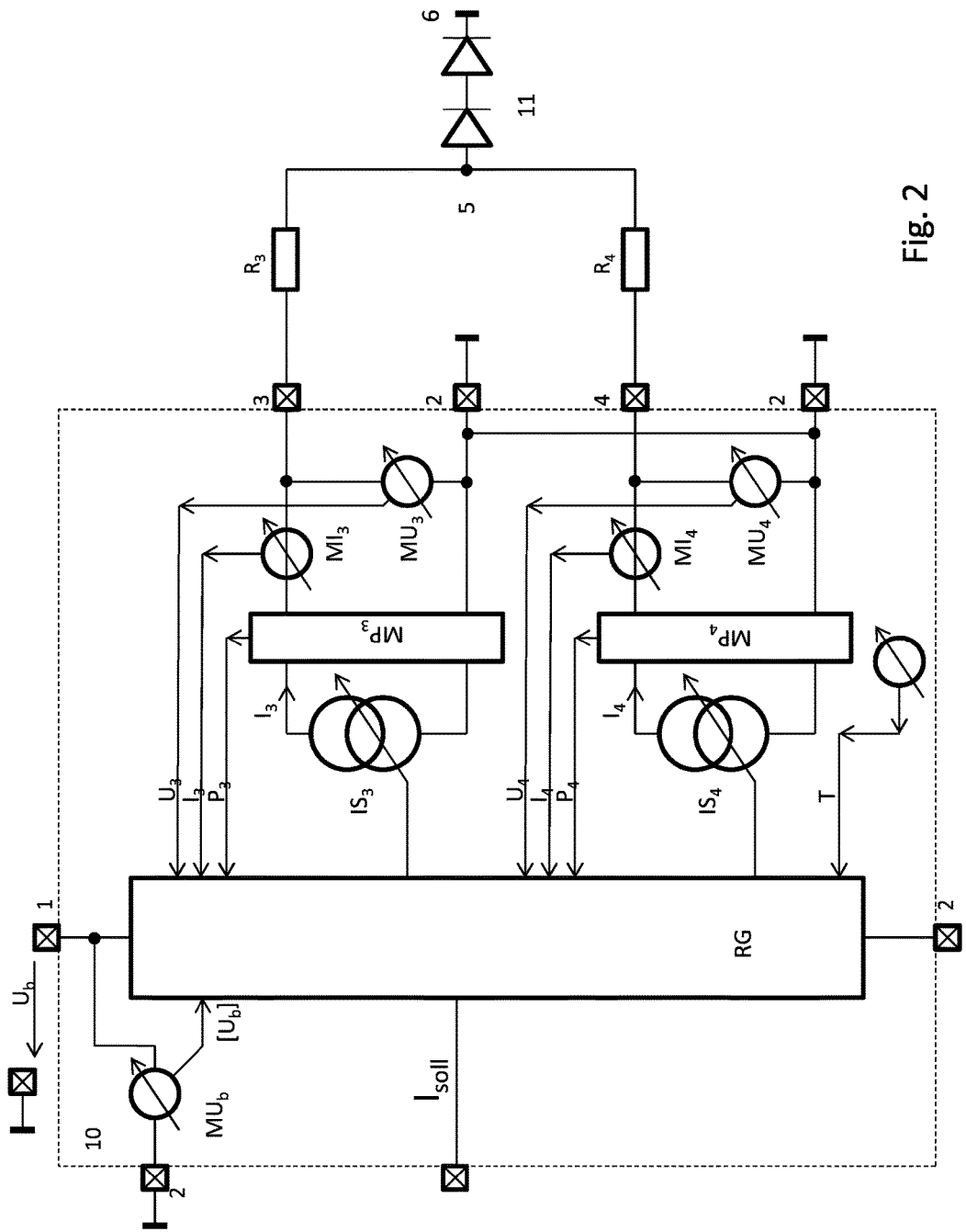
FIG. 2 shows an exemplary basic structure of an apparatus 10 with a single LED chain 11 as consumers and a first resistor $R_3$.

In the circuit according to FIG. 2, other than in the circuit according to FIG. 1, a further resistor $R_3$ is provided.

Figure 3:
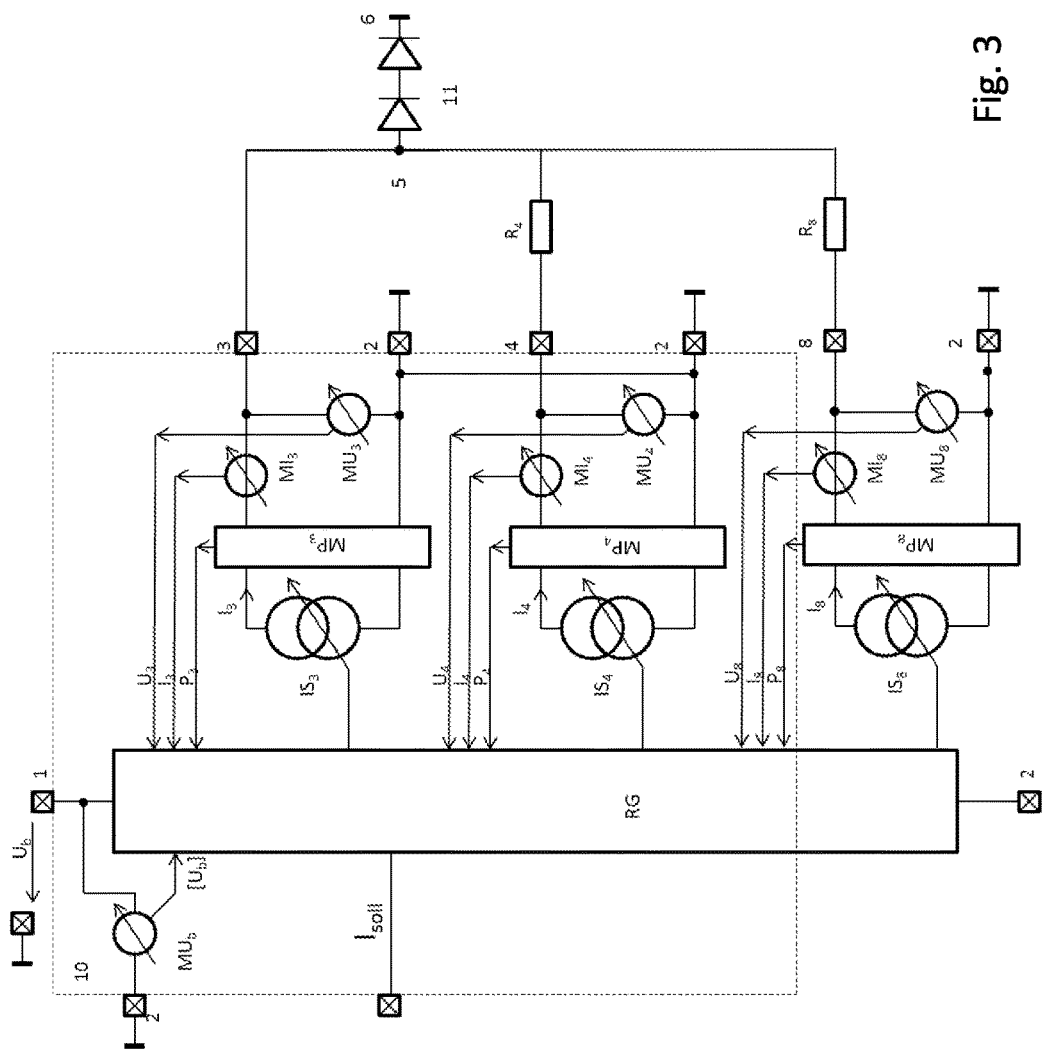
FIG. 3 shows an exemplary basic structure of a control circuit 10 with a single LED chain 11 as consumers and three control channels and three current sources $IS_3$, $IS_4$, $IS_8$.

The circuit according to FIG. 3, other than the one according to FIG. 1, comprises a further output 8 which is connected to the first connector 5 again via an external resistor $R_8$. Also the associated measurement devices $MU_8$, $MI_8$, $MP_8$, deliver the respective measurement values $P_8$, $U_8$, $I_8$ to controller RG which controls the current sources on the whole. Typically, resistor $R_8$ is selected to have twice the value of resistor $R_4$.

Figure 4:
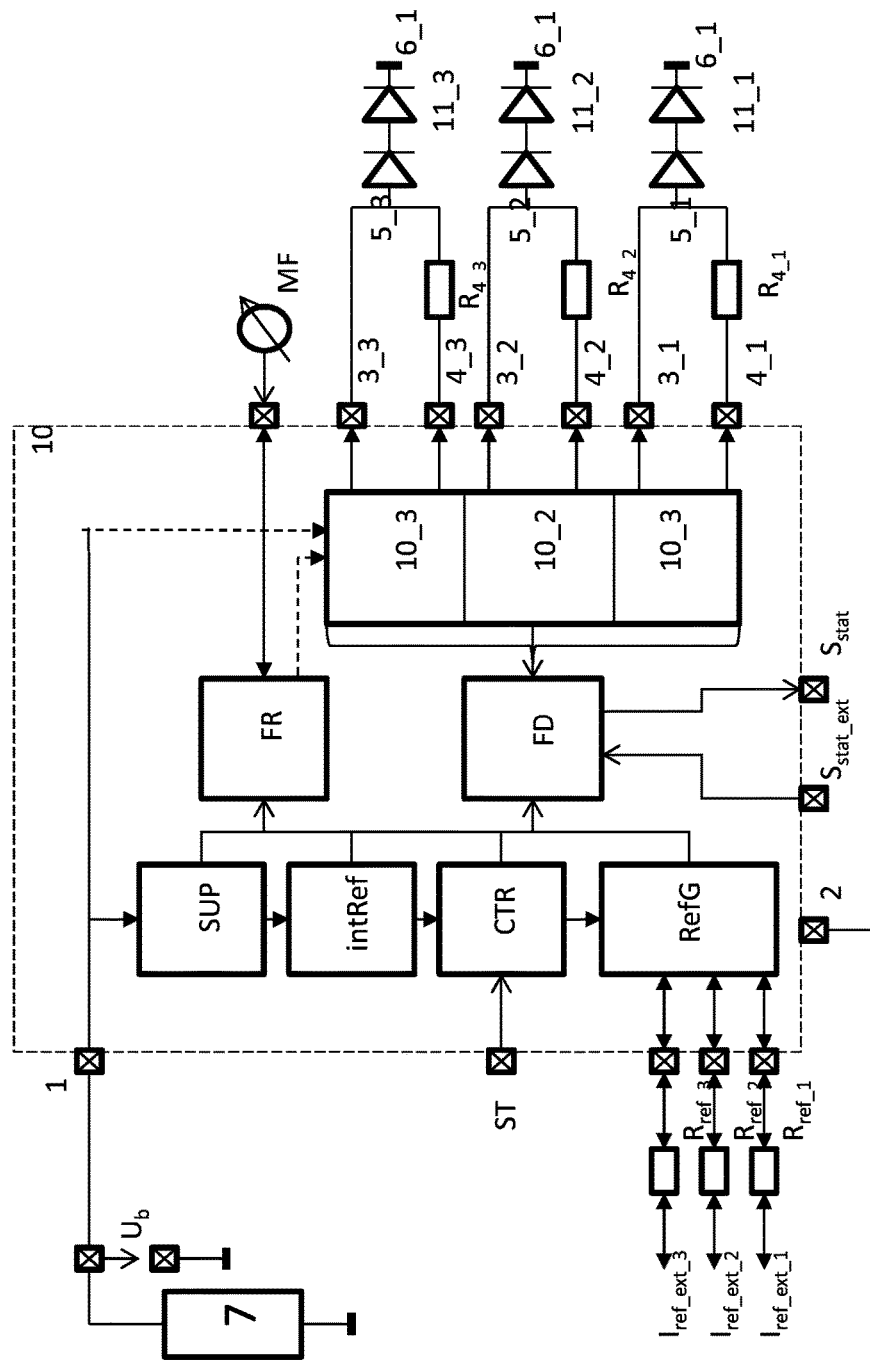
FIG. 4 shows an exemplary basic structure of an apparatus with three LED chains 11_1, 11_2, 11_3 as consumers and three control circuits 10_1, 10_2, 10_3, and an error detection FD, a color sensor MF and a color controller FR.

FIG. 4 shows an exemplary control circuit for RGB-LED illumination. The control circuits 10_1, 10_2, 10_3 of the apparatus will control a respective LED chain 11_1, 11_2, 11_3 of a color. The second connectors 4_1, 4_2, 4_3 are respectively connected via an external resistor $R_{4\_1}$, $R_{4\_2}$, $R_{4\_3}$ to a first connector 5_1, 5_2, 5_3 of the respective LED chain 11_1, 11_2, 11_3. The respective first connectors 3_1, 3_2, 3_3 are directly connected to these. The second connectors 6_1, 6_2, 6_3 of the LED chains 11_1, 11_2, 11_3 are connected to the ground terminal 2 of apparatus 10. A reference generator RefG makes it possible to set the desired values (e.g. $I_{soll}$) of the individual partial apparatuses 10_1, 10_2, 10_3 from an external site by means of the currents $I_{ref\_ext\_1}$, $I_{ref\_ext\_2}$, $I_{ref\_ext\_3}$. These currents can be adjusted via the resistors $R_{ref\_1}$, $R_{ref\_2}$, $R_{ref\_3}$ with voltage default instead of current default. A controller CTR is operative to control the entire apparatus. The latter can be addressed via a data interface ST. The exemplary apparatus is provided with a voltage supply SUP by which the uncontrolled operating voltage $U_b$ will be conditioned for use in control circuit 10. A color controller FR receives, from a color sensor MF, information on the color composition and the intensity of the irradiated light. These information items are converted by the color converter FR into desired-value defaults for the partial apparatuses 10_1, 10_2, 10_3. Thereby, there are set a color composition and illumination intensity in compliance with a default. Of course, it is also possible to measure the reflected light and to readjust the illumination in dependence thereon. In the process, for instance, the desired-value defaults of various desired value sources which were described before can be combined with each other, e.g. by multiplication, in a suitable device, typically the controller RG, to a common desired-value default $I_{sum}$ for the respective sum current $I_3+I_4$, $I_3+I_4+I_8$ and/or the distribution parameter $V_p$. An error detection is operative to compare the measurement values of the partial apparatuses 10_1, 10_2, 10_3 with desired-value defaults or desired-value default ranges. In the process, also past values and derived values can be used. When the error detector FD detects an error condition, the latter will be output via an error signal $S_{stat}$. Of course, outputting via the data interface ST is possible as well. An internal reference serves for setting basic internal parameters.

Figure 5:
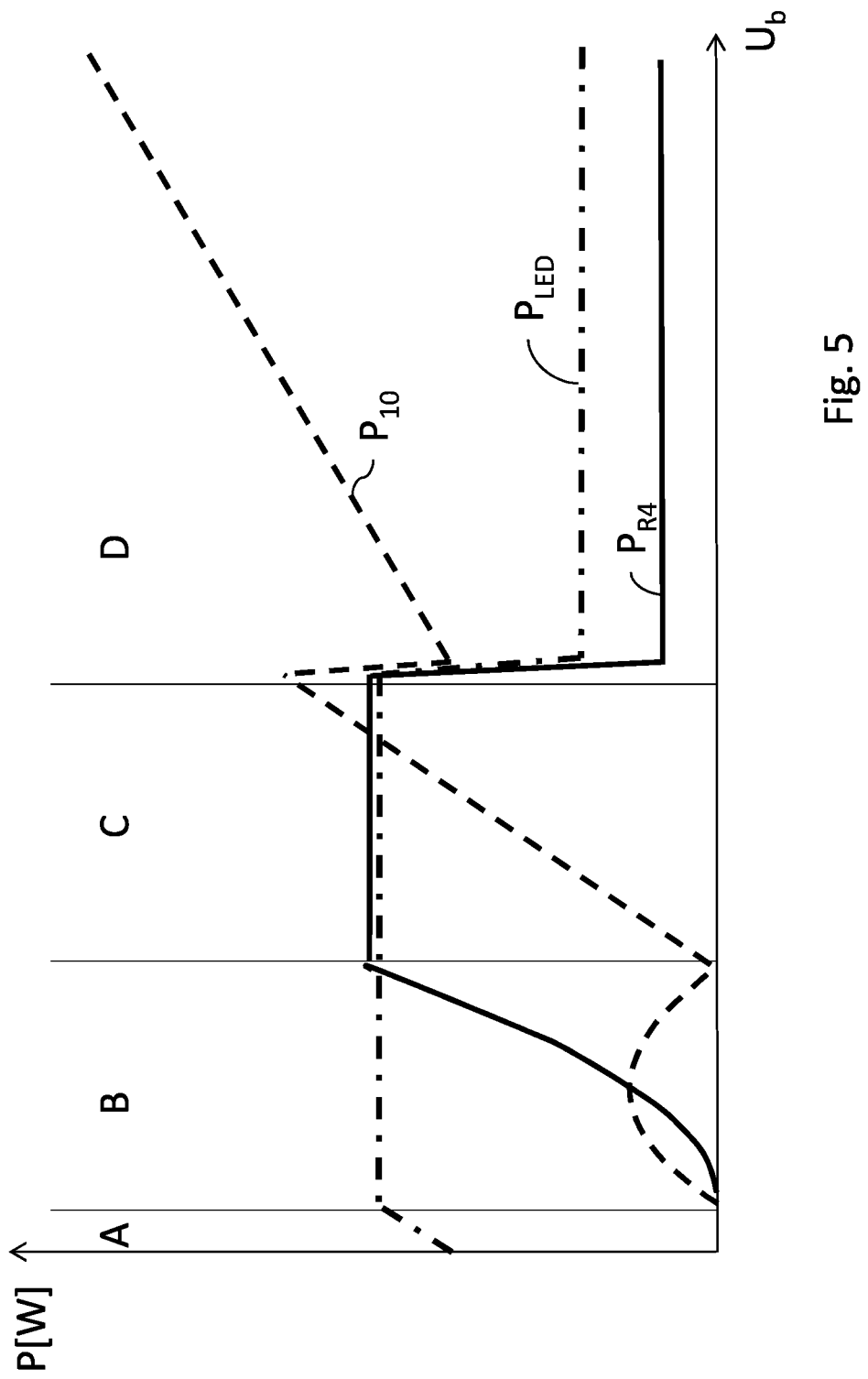
FIG. 5 shows an exemplary variation of the power conversion in the LED, in the control circuit 10 and in the resistor $R_4$ with variation of the operating voltage $U_b$.

FIG. 5 illustrates the distribution of the power consumptions in different operating voltage ranges for an apparatus similar to FIG. 1. In a start-up range A, the LEDs are not yet fully conducting and delimit the current $I_3+I_4$. In this range, typically, only the first output 3 will supply the current of the consumer 11 (here, the LEDs). In a second operating current range B, the current is gradually taken over by the second current path at the second connector 4 with the second external resistance $R_4$. The power $P_{R4}$ which in the process is converted in the resistor $R_4$ will increase parabolically. The power $P_{LED}$ which is converted in the LEDs will remain largely constant at the same time. From a certain point of the operating voltage, the second output 4 cannot supply enough voltage anymore. Thus, the total current $I_3+I_4$ through the LEDs, and thus $P_{LED}$, would increase again. Therefore, now, in a third operating voltage range C, the additional power loss is converted in the control circuit. The power loss $P_{10}$ of the control circuit is now continuously increasing. The power input $P_{LED}$ of the LEDs remains constant further on. The power input $P_{R4}$ of the second external resistor $R_4$ remains constant. In a fourth operating voltage range D, the control cannot be maintained anymore, and the system will enter an emergency operating mode.

Figure 6:
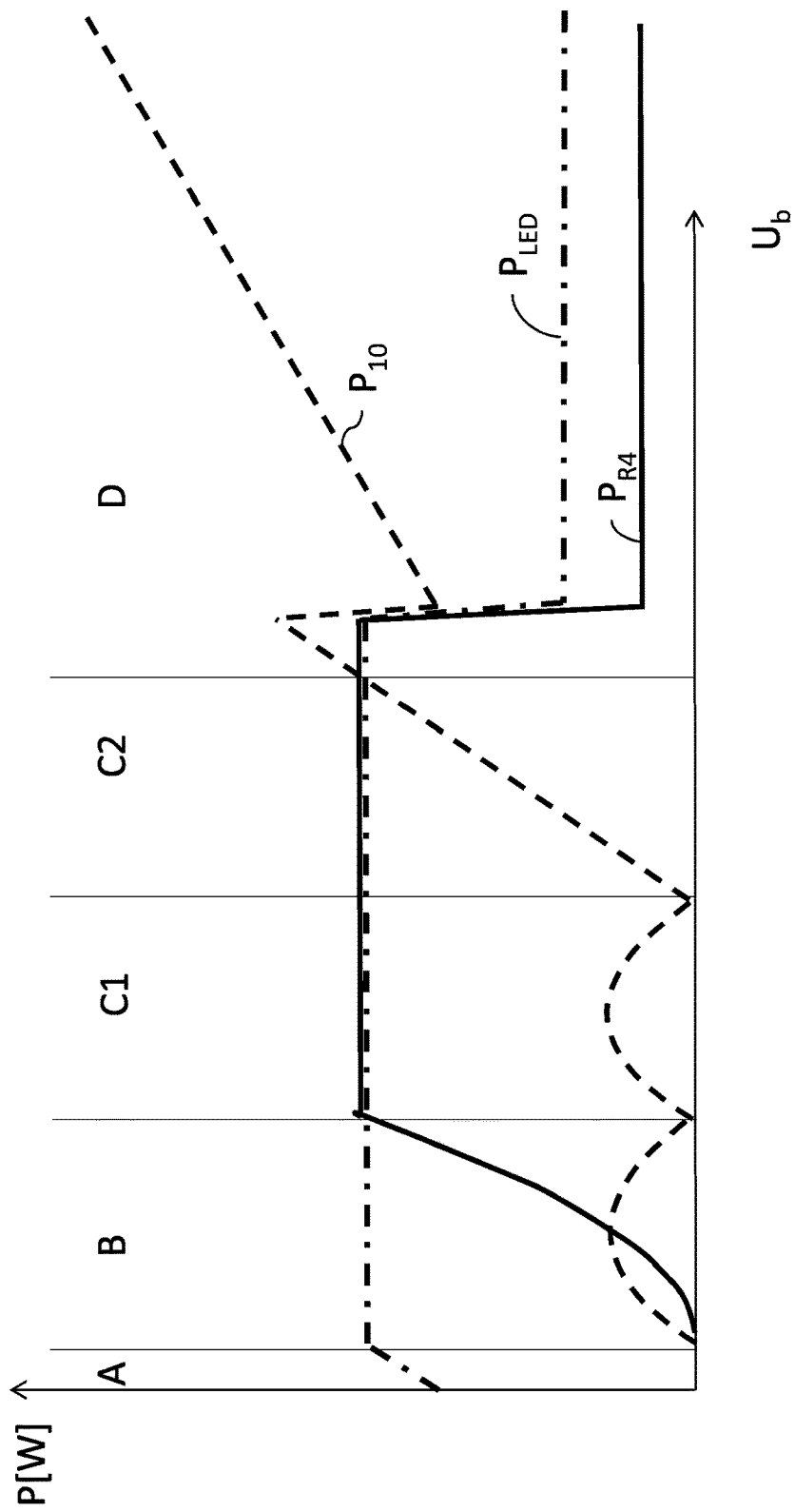
FIG. 6 shows an exemplary variation of the power conversion in the LED, in the control circuit 10 and in the resistor $R_4$ with variation of the operating voltage $U_b$ in three current sources.

FIG. 6 illustrates the control characteristic of an example for energy supply of LEDs. This control characteristic is provided in such a manner that, in dependence on the operating voltage $U_b$, it has a plurality of operating voltage ranges. For the following explanations, it is assumed for the sake of better understanding that the first resistor $R_3$ has an ohmic value of zero. If a plurality of branches exist, one resistor should have the value zero. In a first operating voltage range A, the light diodes (LEDs) are not yet conducting. Thus, in this operating voltage range, the current through the LEDs and thus the power that is output will increase in dependence on the operating voltage $U_b$. In this operating voltage range, the control circuit does not yet supply the desired current $I_{sum}$ to the LEDs because the sum current $I_3+I_4$ is delimited not by the control circuit 10 but by the LEDs, i.e. the consumer 11. Upon transition from the operating voltage range A to a second operating voltage range B, the first output 3 supplies the entire current. In the present example, the first output 3 is connected directly to consumer 11. At the operating voltage point, the output current $I_4$ of the second output 4 which via the second external resistor $R_4$ is connected to consumer 11, is still 0 A. Thus, the first output 3 has to supply the entire sum current $I_3+I_4$ because a voltage drop via the second external resistor $R_4$ at the second output 4 is not desired. With the transition into the operating voltage range B, the controller of the current source, in order to not have to supply current anymore, would have to reduce—at the first output 3—its internal conductive value connected in parallel to the current source. This would lead to an increasing power loss in this controller. Therefore, the second output will only gradually take over a part of the sum current $I_3+I_4$. This is effected e.g. in that the first output voltage $U_3$ at the first output 3 of control circuit 10 and, therefore, the voltage that decreases across the LEDs and thus across consumer 11, is kept constant. This means that the current $I_3+I_4$ through the LEDs will remain constant. For this purpose, the second output current $I_4$ from the second output 4 is adjusted in such a manner that, across the second external resistor $R_4$ that is connected between the second output 4 and the LEDs, i.e. the second connection of consumer 6, the additional voltage will decrease. Thus, in this operating voltage range B, the power loss $P_{R4}$ of the second external resistor $R_4$ will increase parabolically while the power loss $P_{LED}$ that is released in the LEDs will remain constant. From a certain point, the current source of second output 4 does not supply enough current $I_4$ anymore for still being able to cause the voltage across the resistor to further increase along with the further increasing operating voltage $U_b$. This point marks the transition to a further operating voltage range C in which both the power $P_{R4}$ in the second external resistor $R_4$ and the power $P_{LED}$ in the LEDs remain nearly constant. The additional power loss will now have to be eliminated in the control circuit 10 itself, which can be performed only up to a further operating voltage point. Then, a transition occurs into an operating voltage range D in which the power in its entirety has to be lowered so as to prevent destruction of the control circuit 10 and/or of the LEDs, i.e. consumer 11. Typically, in this operating voltage range D, a correct and full functioning of consumer 11 or of all consumers is not existent or possible.

In case that more than two outputs are used for supply to a consumer, here an LED chain, there can of course be envisioned more-complex range patterns.

Thus, in the ranges B and C, the sum of the output currents $I_3+I_4$ is kept constant. In range B, readjusting is performed by the output current $I_4$ of second output 4 while, in range C, by the voltage drop across control circuit 10, the sum current $I_3+I_4$ is readjusted by controller 11 and is kept constant. The range D is a range which typically is outside the respective specification for control circuit 10 and thus merely needs to have emergency operating characteristics.

Figure 7:
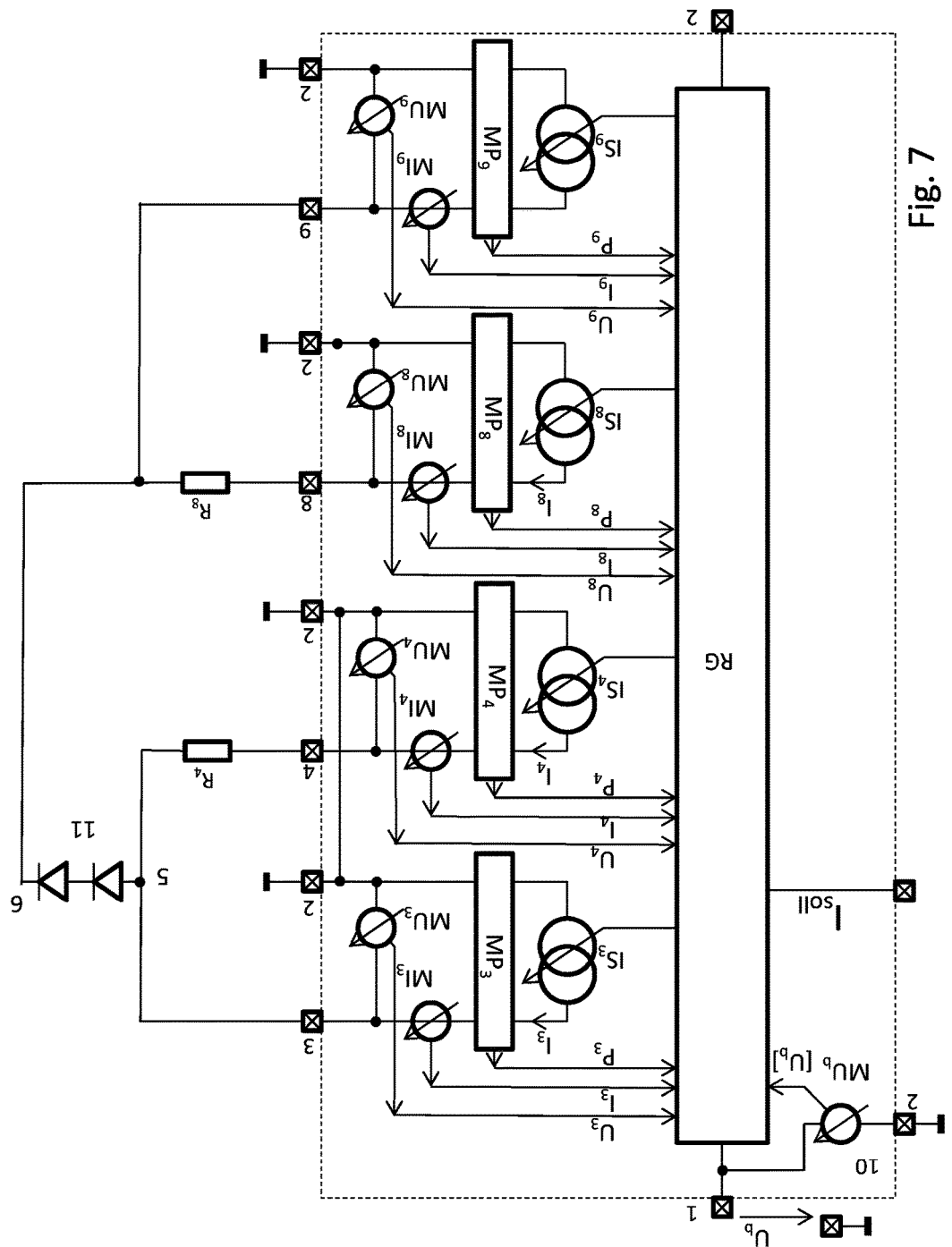
FIGS. 7 and 8 show circuits of alternative variants of the apparatus with merely three connectors for energy supply to the control circuit and energy output through the control circuit to the consumer, and respectively with four power provision modules.

FIG. 7 shows a circuit arrangement similar to that according to FIG. 1 but with a reduced number of input and output connectors. In other regards, the functionality of this circuit is the same as described above.

Figure 8:
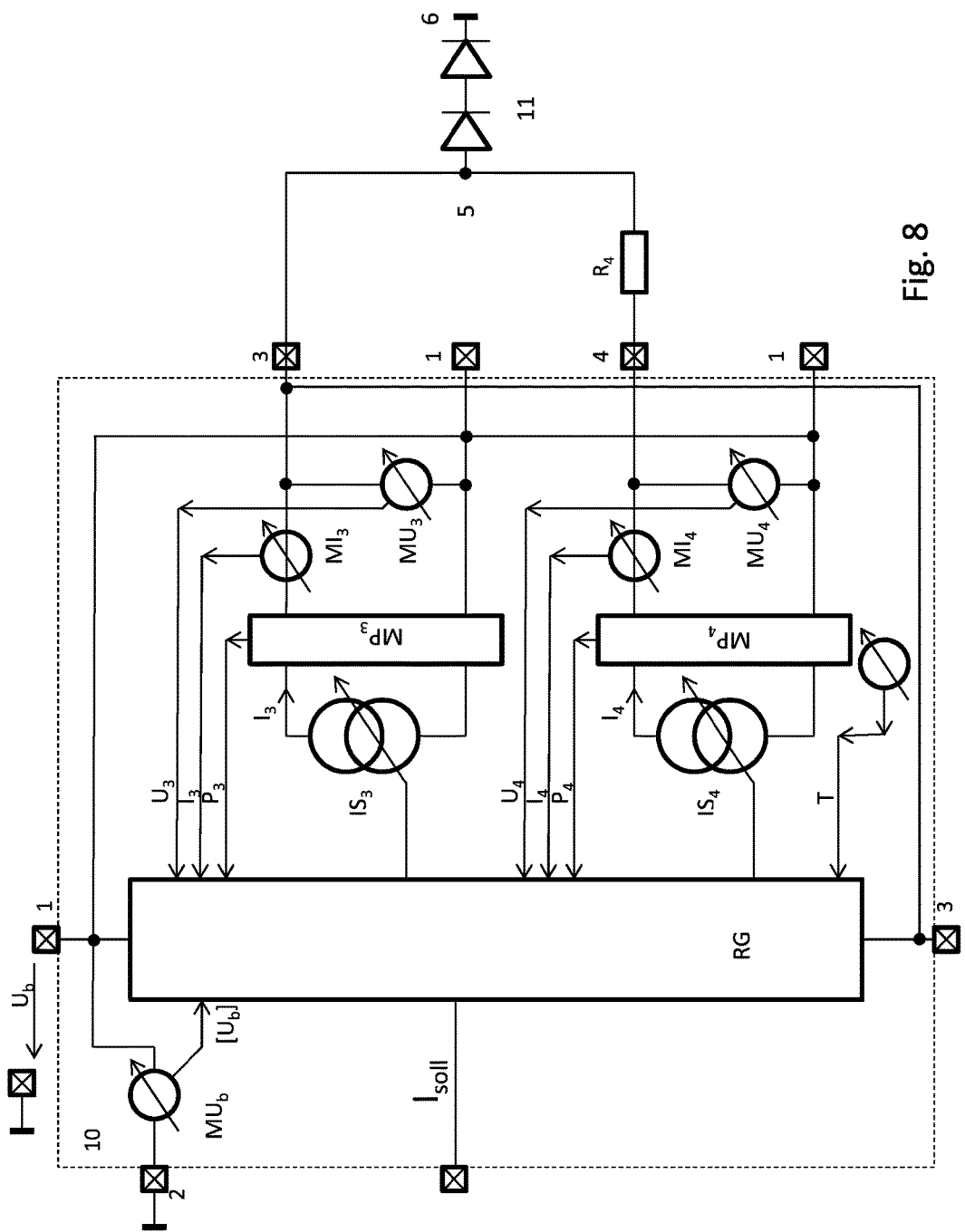
Figure 9:
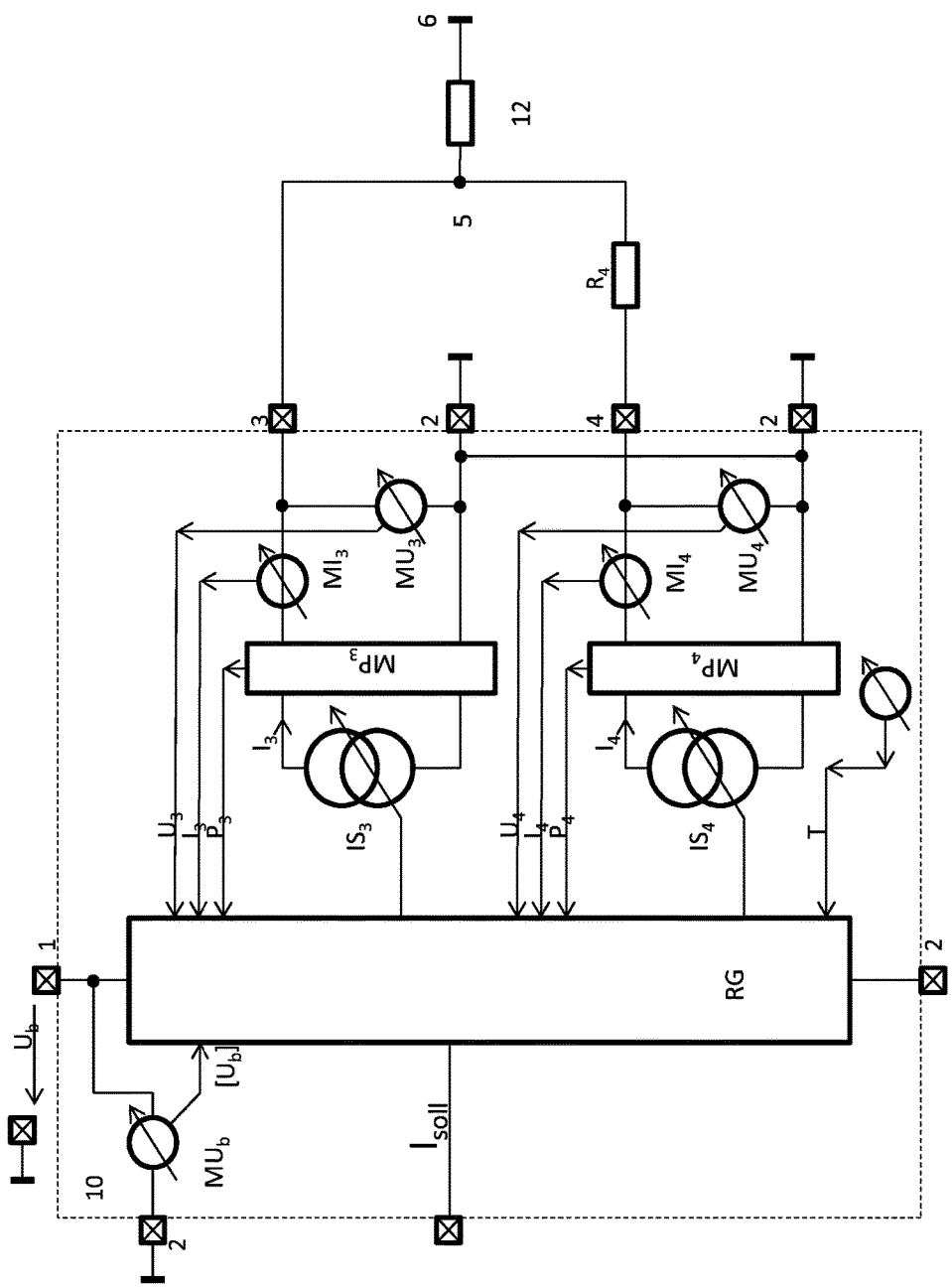
FIGS. 9 to 12 show various examples of circuits corresponding to those shown in FIGS. 1 to 8, however with an ohmic load 12 as a consumer.
Figure 10:
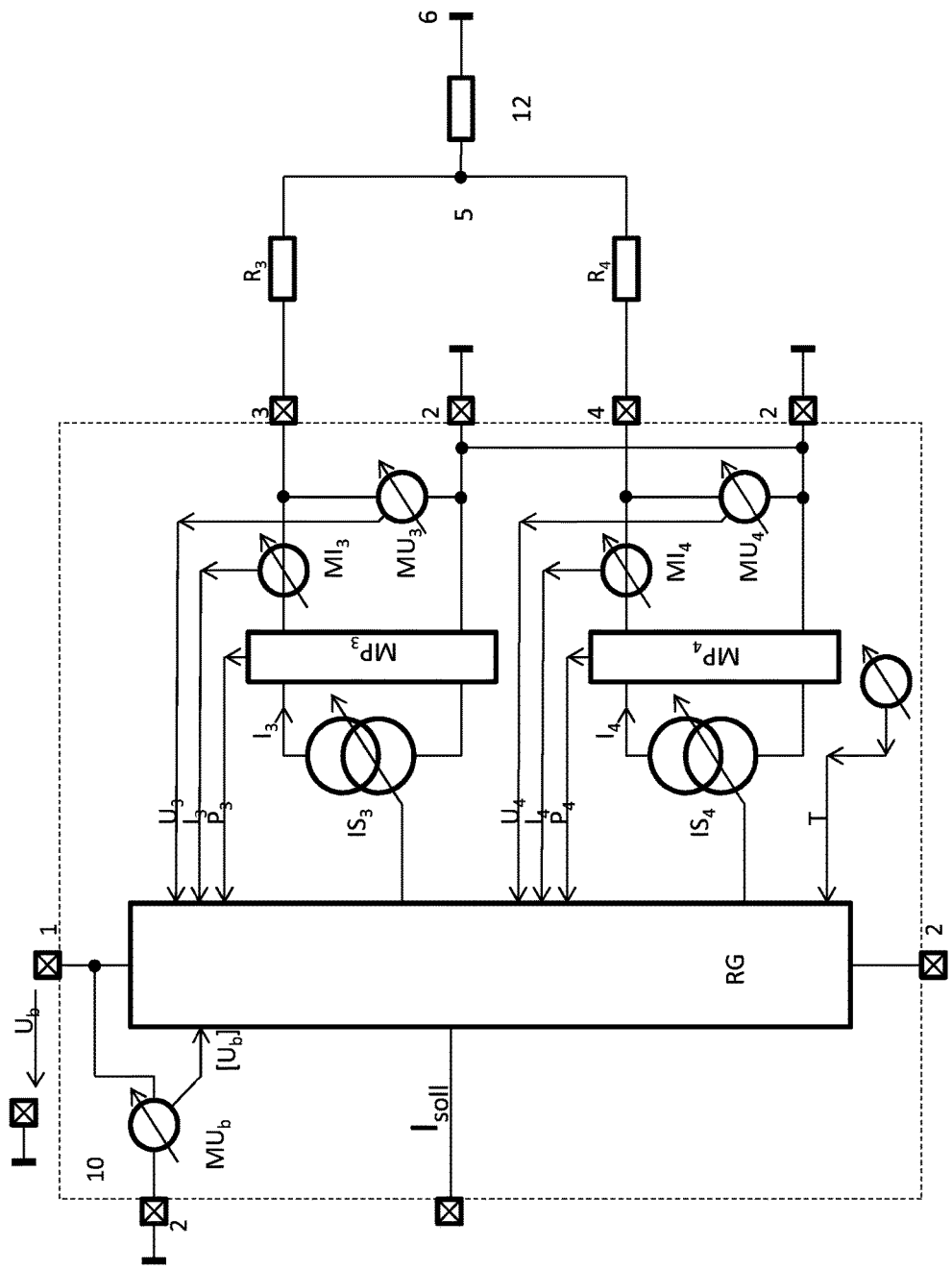
Figure 11:
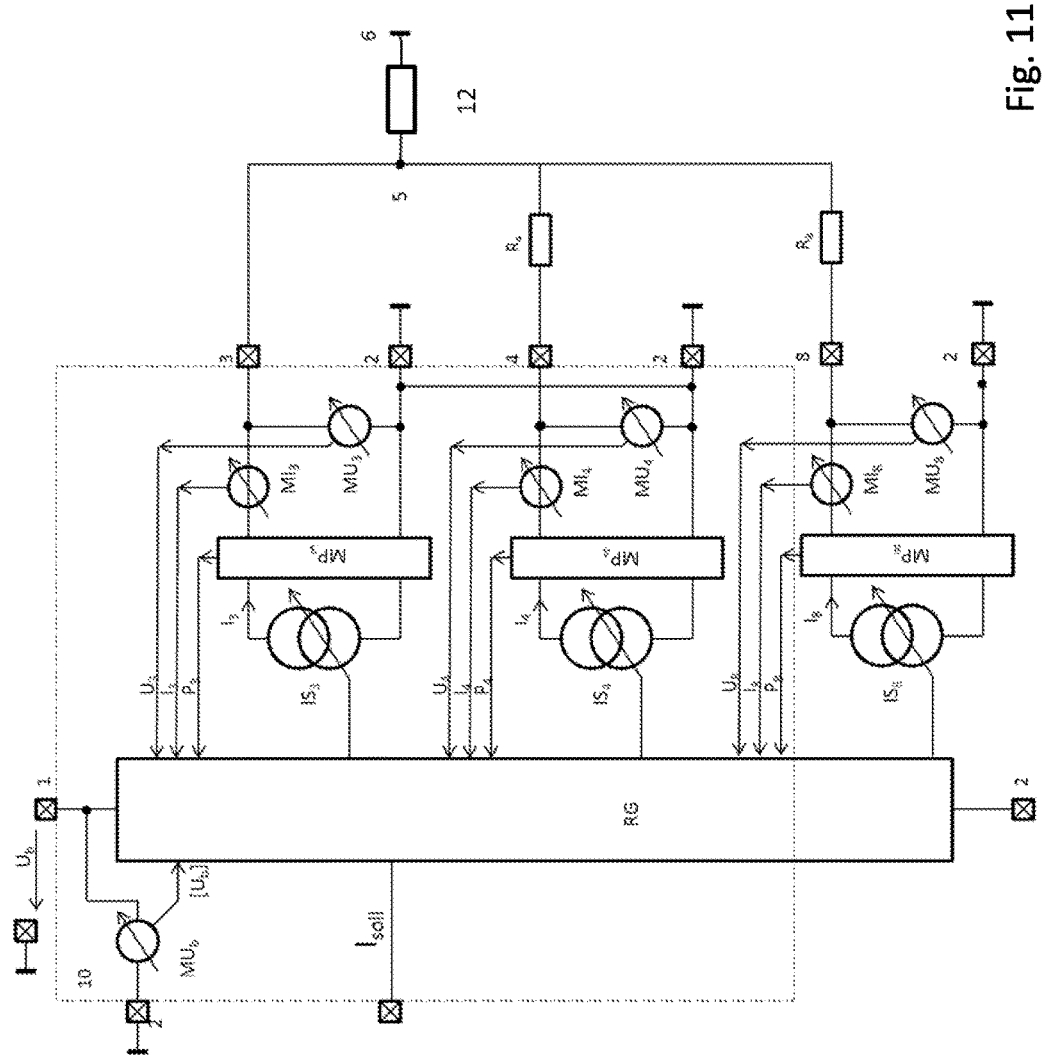
Figure 12:
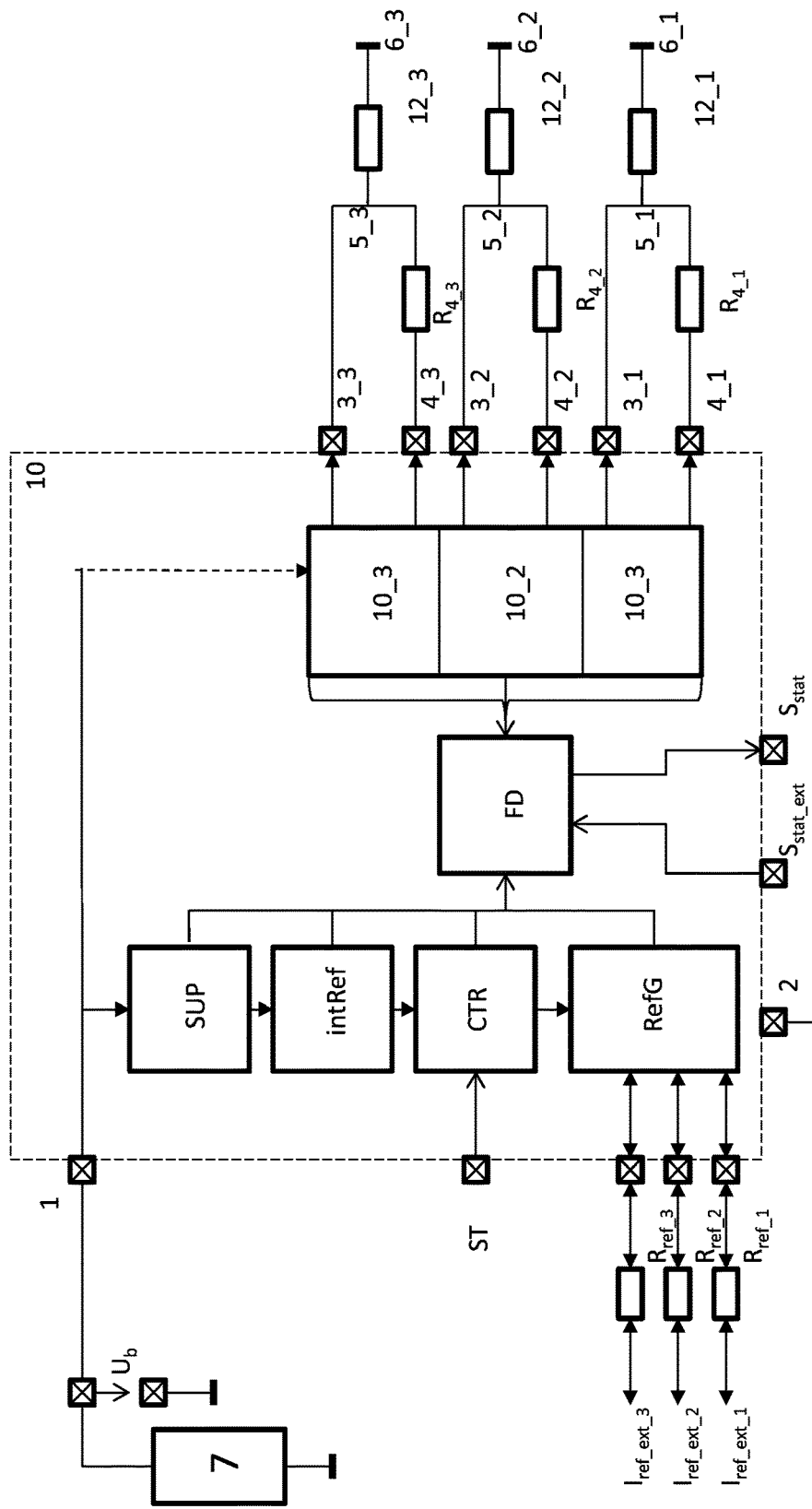
Figure 13:
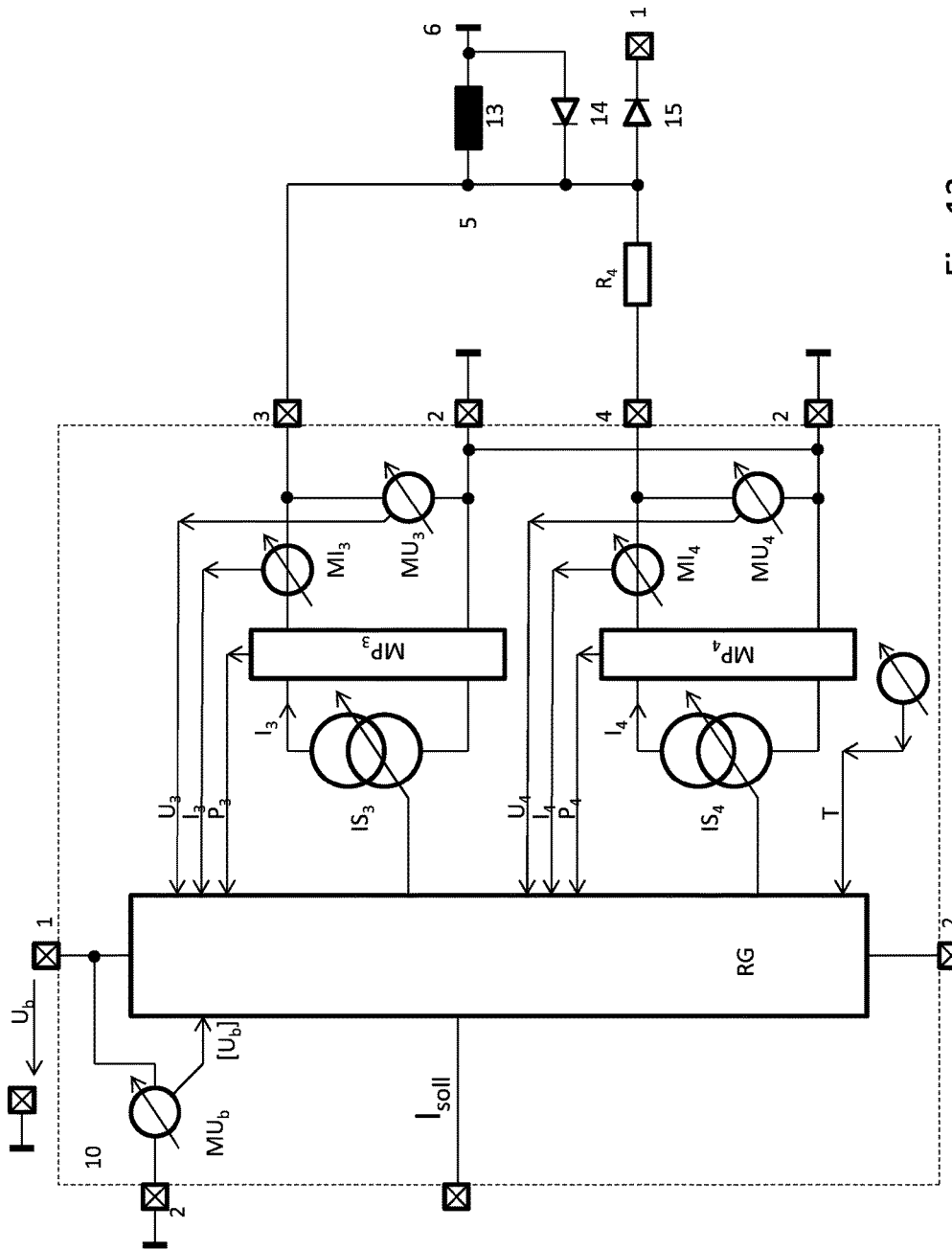
FIGS. 13 to 16 show various examples of circuits corresponding to those shown in FIGS. 1 to 8, however with an inductive load 13 as a consumer and with a free-wheeling diode 14 as well as with an overvoltage protection diode 15, both being associated to the inductive load 13.
Figure 14:
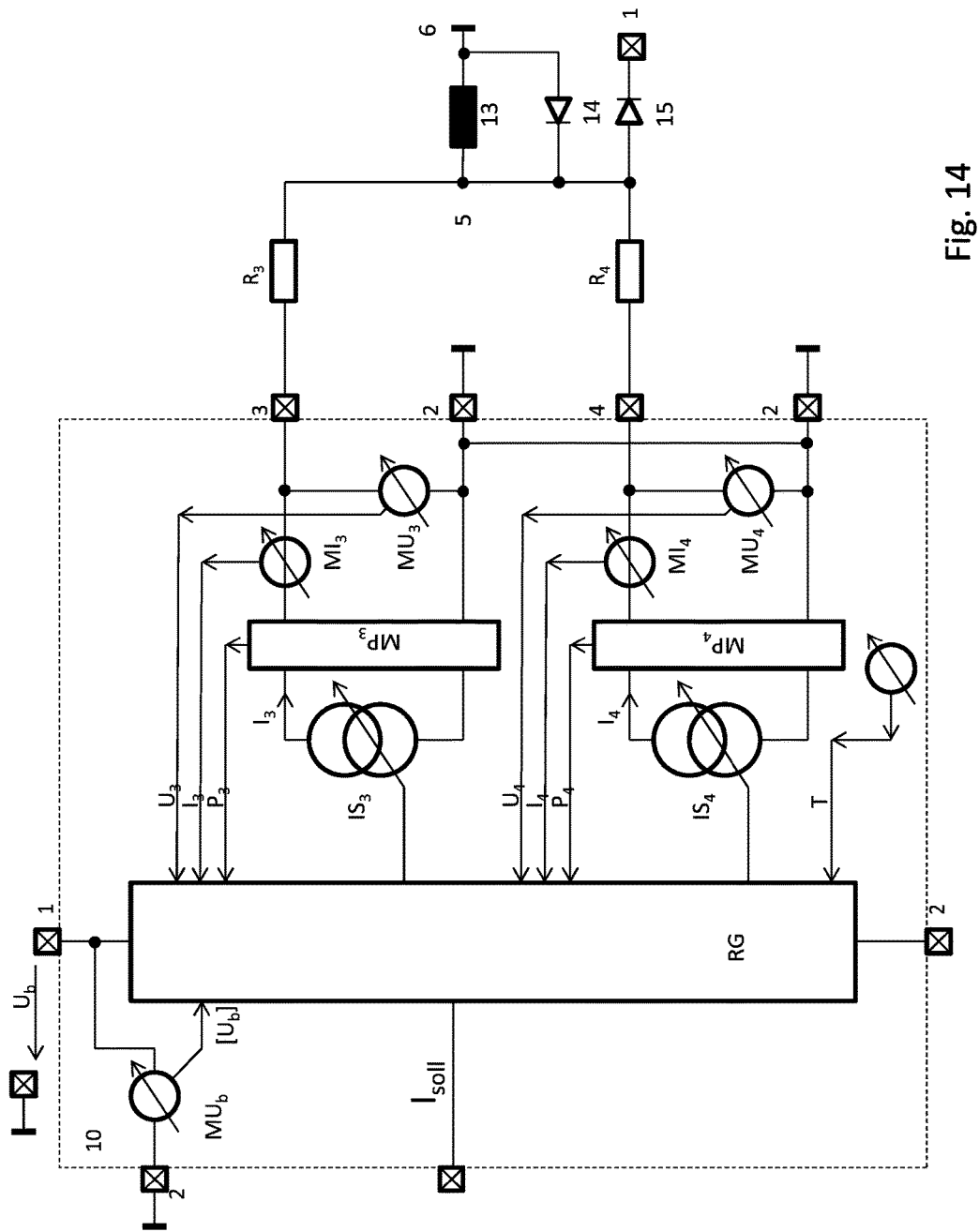
Figure 15:
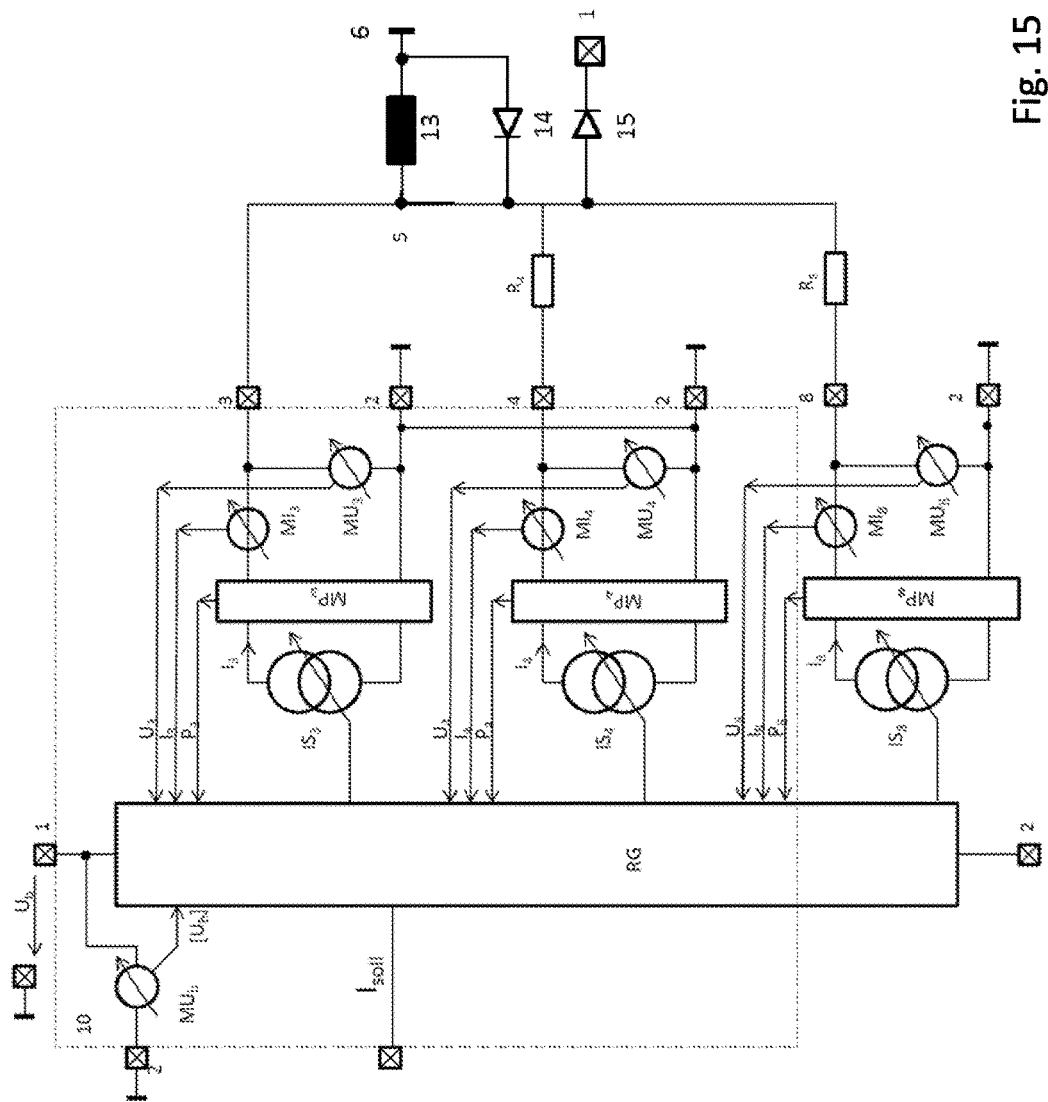
Figure 16:
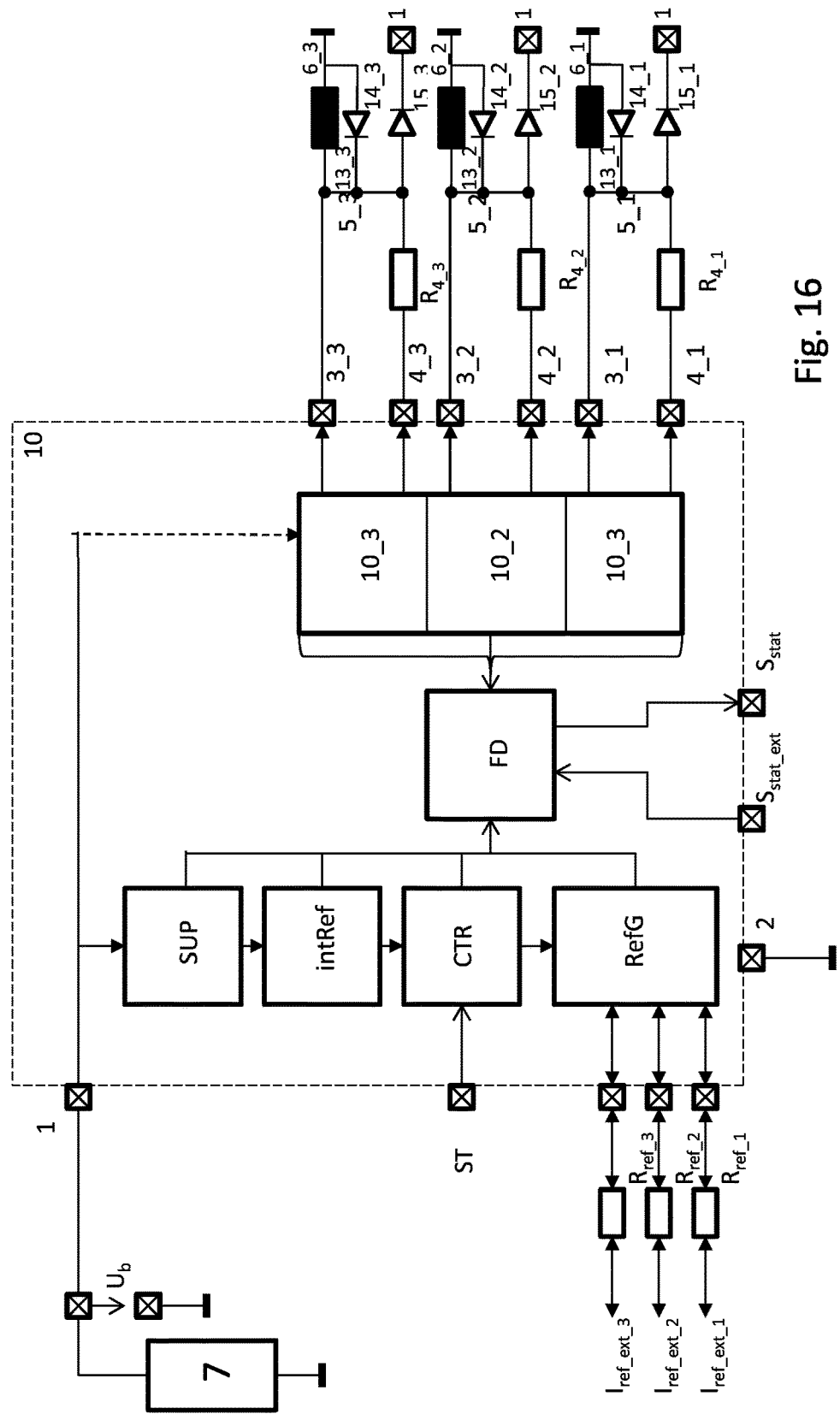
Figure 17:
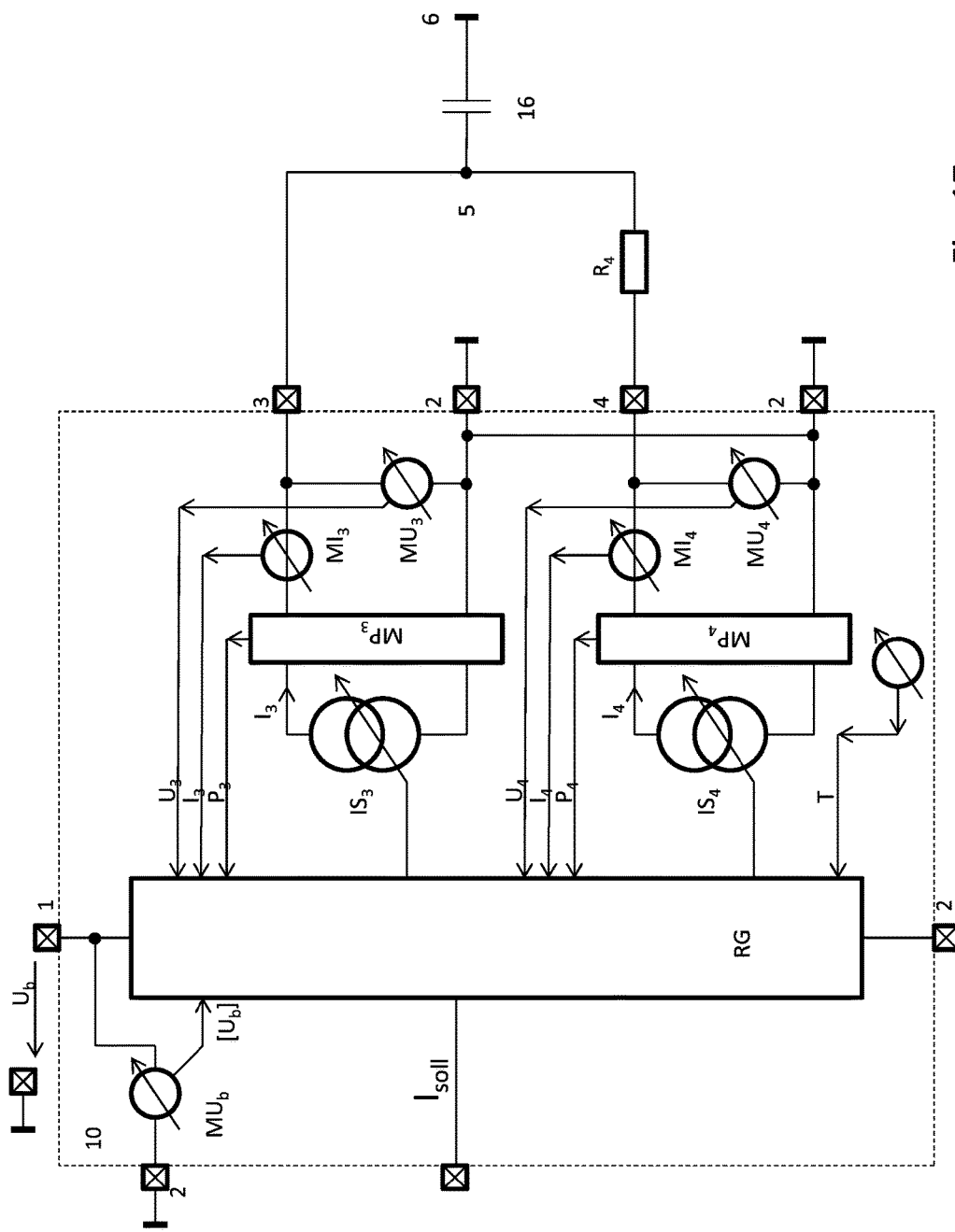
FIGS. 17 to 20 show various examples of circuits corresponding to those shown in FIGS. 1 to 8, however with a capacitive load as a consumer.
Figure 18:
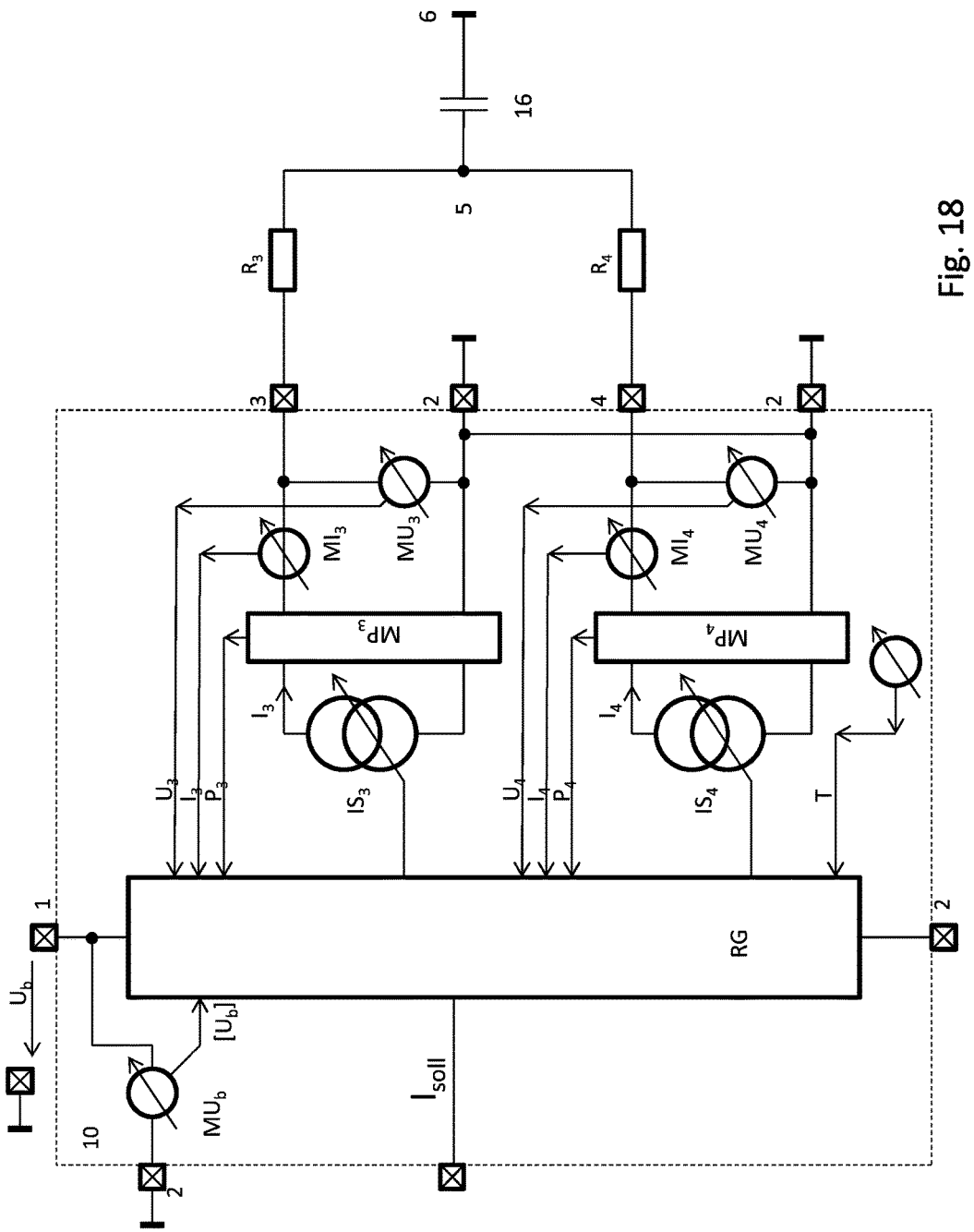
Figure 19:
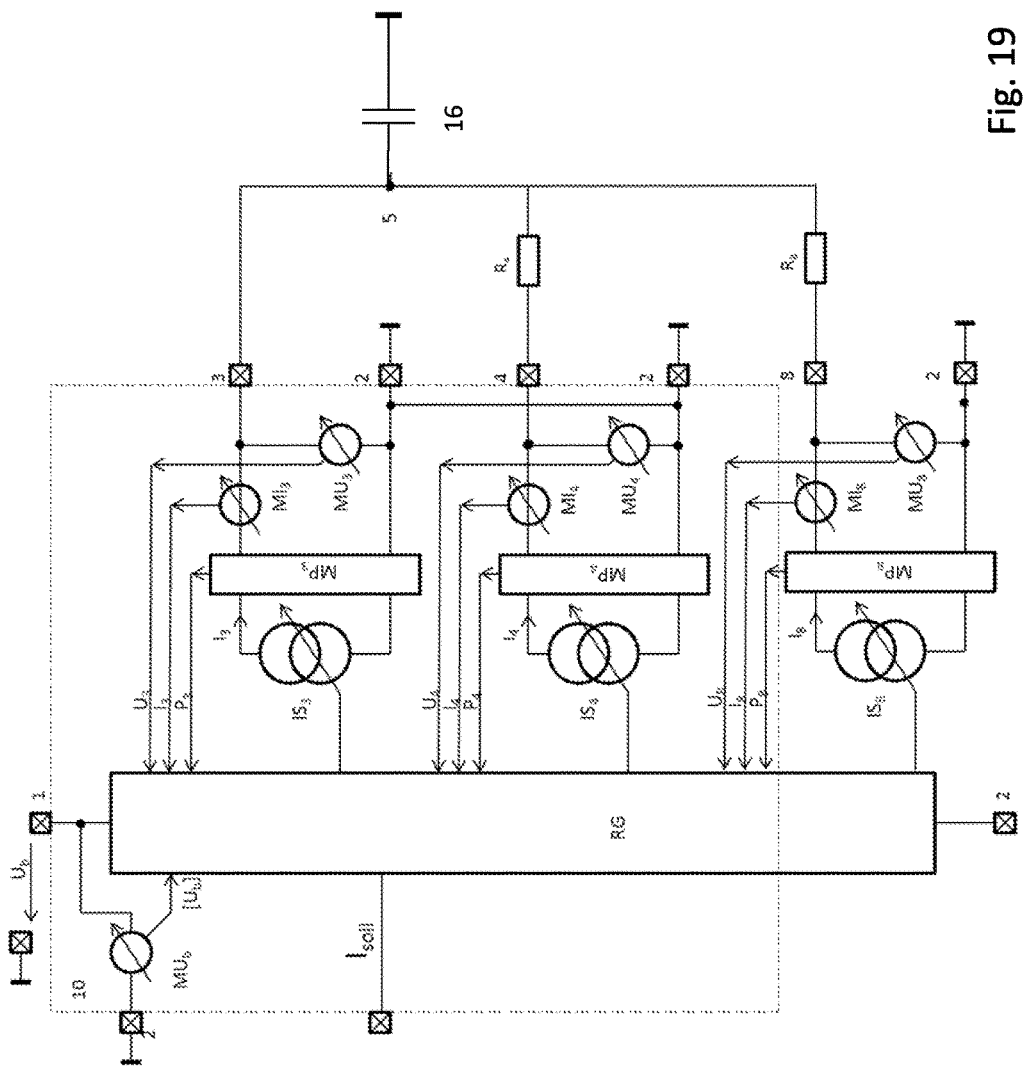
Figure 20:
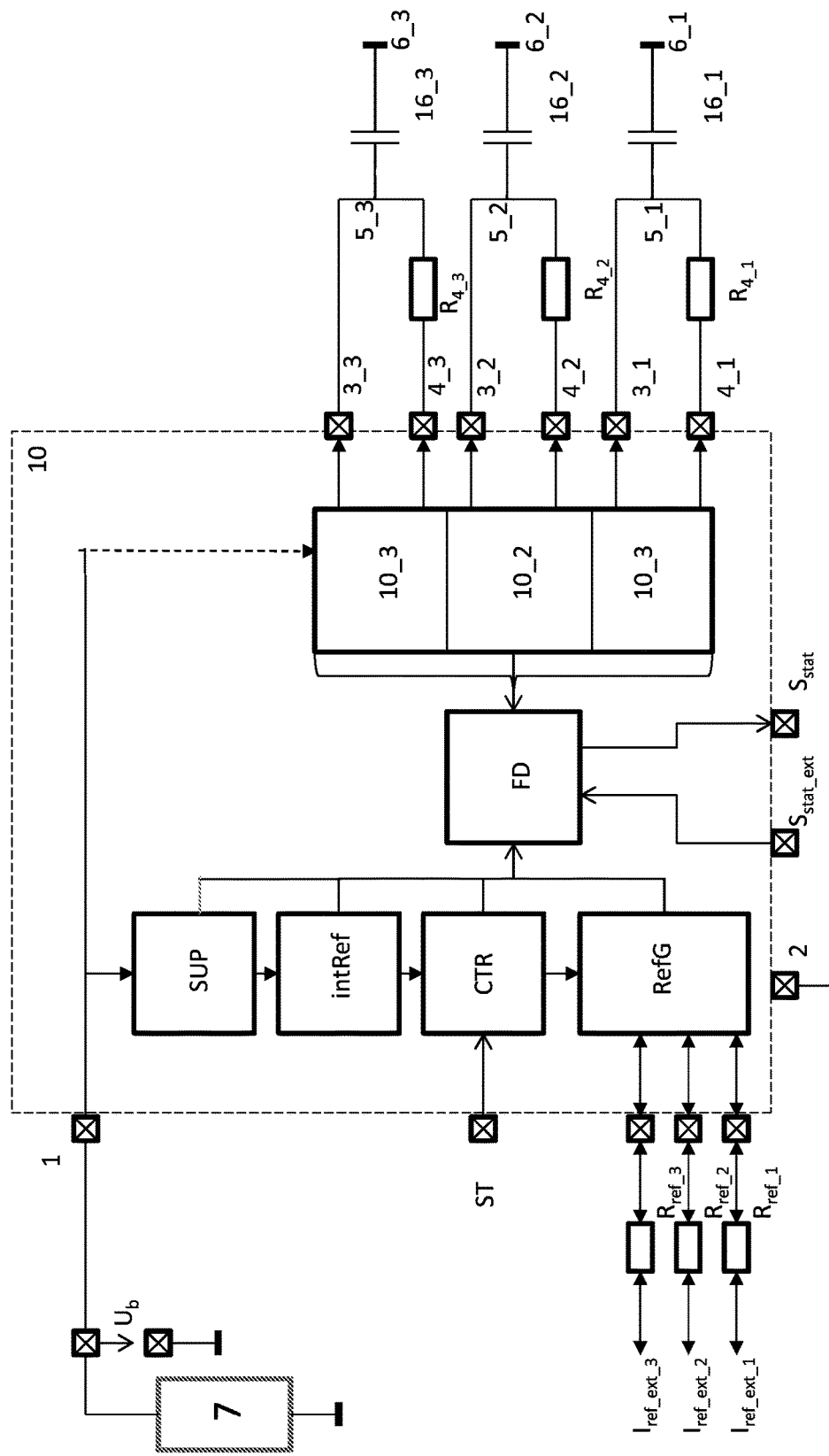

From the example according to FIG. 8, it can be seen that the consumer 11 is powered via a total of four power modules. Respectively two of these power modules are connected to a connector of the consumer, wherein each of the these pairs of power modules comprises a path that is connected to the consumer with the lowest possible ohmic value (in the ideal case without an effective ohmic value) and a conductive path with external resistor.

For clarification and generalization of the concept, it should be stressed here that the term "external resistor" is not necessarily meant in the sense of an ohmic resistor. Instead, by this term, it shall be expressed that there exists a powerloss consumer arranged externally of the IC, which emits electrical power loss e.g. in the form of heat to the ambient environment.

In FIGS. 9 to 20, the above described examples are shown in their applications for consumers other than LEDs. In FIGS. 9 to 12, the consumer is an ohmic load 12, in FIGS. 13 to 16, it is an inductive load 13 (with free-wheeling diode 14 and overvoltage protection diode 15) and in FIGS. 17 to 20, it is a capacitive load 16. In other regards, the devices according to FIGS. 9 to 20 operate in the manner described above in the context of FIGS. 1 to 8. In these cases, it is possible that the ohmic, inductive or capacitive load in the circuits according to FIG. 12, 16 or 20 can be configured both as a star connection and as a delta connection.

Hereunder, for simplification, there is described the supply of a single consumer by means of two current sources feeding current into two current paths. This idea may be extended to three or more current paths.

The reference numerals indicated hereunder are related to the drawing.

Thus, described herein is an apparatus for supplying at least one consumer 11 in a controlled manner with electrical energy by use of a control circuit 10. For simplification, it can be assumed that the control circuit 10 is provided with at least four connectors 1, 2, 3, 4. Herein, one connector 2 shall be the ground connection and the reference potential of the control circuit 10 that is a part of the apparatus. An exemplary consumer 11 is provided with two supply connectors 5, 6. The connectors 5, 6 of consumer 11 are connected to an output 3 and to the ground connection 2 of control circuit 10. The control circuit 10 is powered with electrical energy from a controlled or uncontrolled energy source 7 at least via its supply voltage connector 1 and the ground connection 2. The second output of control circuit 4 is electrically connected via a second external resistor $R_4$ to a first connector 5 of consumer 11. Herein, the consumer 11 can also be nearly any random electrical network of a plurality of consumers which are parts of consumer 11. For instance, parts or the entirety of the arrangement can be a serial and/or parallel connection of LEDs. It is only important that the supply of at least a part of the consumers is performed via the connectors 5, 6.

In any case, the consumer 11 should have a common reference potential with the control circuit 10 and the energy source 7. This connection can be established electrically in a direct manner or also in an indirect manner via a further consumer or a further consumer network. For instance, the second connector 6 of consumer 11 can be connected directly to the ground connection 2 of control circuit 10.

Of course, it is possible that, between the first output 3 of control circuit 10 and the first connector of consumer 5, there exists, instead of a direct connection, a connection via a first external resistor $R_3$. It is only essential that said first external resistor $R_3$ has a different value than the second external resistor $R_4$ because it is only then that a controlling of the site of the occurrence of the power loss is possible to a certain extent. Of course, it is reasonable and beneficial if one of the external resistors $R_3$, $R_4$ has a value of zero ohm which in reality corresponds to a value very slightly different from zero. Normally, such a connection is simply realized as a direct connection, which corresponds e.g. to a resistance of a few mOhm.

The resistors $R_3$, $R_4$ can be considered as having different values if, depending on the respective material of the resistors, they differ from each other by more than 1% and preferably more than 2% and preferably more than 5% and preferably more than 10% and preferably more than 25% and preferably more than 50% and preferably more than 100%. Particularly preferred are lead resistances between the first output 3 of control circuit 10 and the second connector of consumer 6 of less than 10 ohm or preferably less than 5 ohm or preferably less than 2 ohm or preferably less than 1 ohm or preferably less than 100 mOhm. In the sense of the present disclosure, such low resistances can be considered in a general manner as having a value of substantially zero.

The consumer 11 is now powered with the sum of the two output currents $I_3+I_4$. To make it possible for the control circuit 10 to fulfill its function, i.e. the controlling of the current through consumer 11, the sum of the two output currents $I_3+I_4$ at the outputs 3, 4 of control circuit 10 has to be controlled. Thus, the sum of the output currents $I_3+I_4$ must be generated within the control circuit as an actual value. In the control circuit, this actual value $I_3+I_4$ will be compared with a desired value $I_{sum}$ which is predefined. In case of deviations between the sum of the output currents $I_3+I_4$ and the desired value $I_{sum}$, both currents will be correspondingly readjusted. In the most simple case, this "corresponding" readjustment is performed e.g. by proportional control wherein the two currents $I_3$, $I_4$ of the two outputs 3, 4 will be readjusted by the same factor. Of course, a correspondence of the desired value $I_{sum}$ to the predefined sum current $I_3+I_4$ can also comprise more-complicated functions than the above defined simply affine representation. It is important that that this correspondence can at least temporarily be described by a bijective, strictly monotone ascending function between the desired value $I_{soll}$ and the current sum $I_3+I_4$. The desired value $I_{sum}$ can be externally predefined or be fixedly predefined in control circuit 10 by an internal reference current $I_{ref\_int}$. Of course, it is possible e.g. to convert these values, by means of analog or digital computing circuits, into other parameters prior to comparison. This default of the desired value $I_{sum}$ can be set externally e.g. by a reference current $I_{ref\_ext}$ or a reference resistance $R_{ref}$. In case of a programmed default, it is possible, e.g. via a data interface ST, to write a value into a register whereupon a digital/analog converter ADC will generate the desired value, as is known.

As a second substantial controllable parameter, the distribution of the sum current $I_3+I_4$ between the output currents $I_3$, $I_4$ is to be mentioned. Since, after all, their sum $I_3+I_4$ is determined by their desired value $I_{sum}$, only the ratio of the distribution between these currents $I_3$, $I_4$ will be defined by at least one control parameter. This control parameter will hereunder be referred to as a distribution parameter $V_p$. This distribution parameter $V_p$ can be determined in a variety of ways. In the most simple case, it will be externally predefined via an interface. This can be performed e.g. again via a data interface ST and a further register or via a PWM interface, wherein the duty cycle represents e.g. the distribution parameter $V_p$ or one of the mentioned analog values $I_{ref\_ext}$. Much better, however, is the determination of the distribution parameter $V_p$ within the control circuit 10 itself. For this purpose, the control circuit typically comprises a suitable component which will perform the determination of the distribution parameter $V_p$.

For determining this distribution parameter $V_p$, it is reasonable, first, to detect substantial operating parameters of control circuit 10. Herein, this detection does not necessarily have to performed continuously. For specific operating parameters, predefined points of time can be provided. For this purpose, the measurements can be performed cyclically or with the aid of a band-limited measurement trigger signal. As soon as the signal fulfills certain conditions, e.g. a zero crossing, a measurement will be performed. The latter methodology has the advantage of making it possible to meet the demands of electromagnetic compatibility. This, however, will depend on the concrete application. Reasonable measurement values have been found to include a measurement of the output current $I_3$, $I_4$ of control circuit 10, and/or a measurement of the output voltage $U_3$, $U_4$ of control circuit 10 as well as a measurement of operating temperatures T. The latter can be measured e.g. in the control circuit 10 itself or in parts of the control circuit 10 and/or in the vicinity of the control circuit 10 and/or in the vicinity of a resistor $R_3$, $R_4$ and/or in the vicinity of a consumer 11. One or a plurality of these values can then be converted into said distribution parameter $V_p$ by analog or digital computation. Of course, a multidimensional control which will control both the current sum $I_3+I_4$ and the current distribution between the output currents $I_3$, $I_4$ is reasonable because, by way of the measurements, it is particularly possible to detect fault conditions, which may result in switch-off of the control circuit by switching off one or a plurality of outputs. In so far, it appears reasonable to consider not only the present values of these measurement values but also their previous values and previous values for the desired value of the current sum $I_{sum}$ and the distribution parameter $V_p$ for computation of the present desired values for the current sum $I_{sum}$ and the distribution parameter $V_p$. Optionally, these previous values are temporarily stored in a suitable analog or digital memory. Said analog memories can be a low-pass or a sample and hold circuit.

All these measured parameters and also the development of the stored values and their single and higher derivatives and values derived therefrom can respectively be compared to desired values.

Therefore, the apparatus comprises a component, typically a controller RG, for comparing one of the measured values or a temporarily stored measurement value or a value derived therefrom with an associated desired value. The comparison is carried out by controller RG in that the controller examines whether said measured value is smaller than the desired value or larger than the desired value. Of course, it is reasonable in some cases that the controller will examine whether the measured value is equal to a desired value. This means that the desired value has to lie within a tolerance band around the desired value. Thus, what is involved here is rather a tolerance band. Of course, it would then not be reasonable if these measured values were at the same time evaluated as larger or smaller. As measurement values for such a comparison, there could be used e.g. one of the output currents $I_3$, $I_4$, $I_8$ or one of the output voltages $U_3$, $U_4$, $U_8$ or one of the output powers $P_3$, $P_4$, $P_8$ or the sum of all or a part of the output currents $I_3+I_4$, $I_3+I_4+I_8$ or the sum of all or a part of the output powers $P_3+P_4$, $P_3+P_4+P_8$ or the operating voltage $U_b$ made available by energy source 7 or the temperature T of control circuit 10, the temperature T of a part of control circuit 10 or the temperature T in the vicinity of control circuit 10 or the temperature T in the vicinity of at least one consumer 11, the temperature T in the vicinity of at least one external resistor $R_3$, $R_4$, $R_8$ or the temperature T in a coolant or a cooling medium in the vicinity of a resistor $R_3$, $R_4$, $R_5$ or a temporarily stored value of these values or a magnitude derived from these values and/or from their temporarily stored values.

It has been shown that good results can already be obtained if the distribution parameter $V_p$ is the operating voltage $U_b$ or correlates with it. However, it can also be envisioned that, as a distribution parameter $V_p$, use is made of one of the output currents $I_3$, $I_4$ or one of the output voltages $U_3$, $U_4$ or one of the output powers $P_3$, $P_4$ or the sum of all or a part of the output currents $I_3+I_4$ or the sum of all or a part of the output powers $P_3+P_4$ or the temperature T of control circuit 10, the temperature T of a part of control circuit 10 or the temperature T in the vicinity of control circuit 10 or the temperature T in the vicinity of a consumer 11, the temperature T in the vicinity of a resistor $R_3$, $R_4$ or the temperature T of a coolant or a cooling medium in the vicinity of a resistor $R_3$, $R_4$.

Further, however, it is also possible to control the sum of the output currents $I_3$, $I_4$ in dependence on one of the output voltages $U_3$, $U_4$ or in dependence on one of the output powers $P_3$, $P_4$ or in dependence on the sum of the output powers $P_3+P_4$ or in dependence on the temperature T of control circuit 10 or the temperature T of a part of control circuit 10 or the temperature T in the vicinity of control circuit 10 or the temperature T in the vicinity of a consumer 11 or the temperature T in the vicinity of a resistor $R_3$, $R_4$. Instead of the above-mentioned values or in addition to them, it is also possible to use, for the controlling, stored values of these values and/or magnitudes derived from these values or the operating voltage $U_b$.

As already mentioned, the existing measurement values open up the possibility to use them for error recognition. For this reason, the apparatus does not only comprise components for performing these measurements and generating said control signals $I_{soll}$, $V_p$ from these, but preferably—even though not necessarily—also a component that has the function of error monitoring. This component will emit at least one error signal $S_{stat}$ which can signal an error. Such an error signal $S_{stat}$ can also consist of the contents of a register or of a bit, which can be read via a digital interface, e.g. a data interface ST, and whose value is generated by said component. Of course, analog signaling via special conduits is possible as well.

In this regard, it is of special importance that this component should be able to receive also error messages of other systems which are not a part of the control circuit. This, the component preferably should be adapted to be linked to the error signal of a further apparatus. This makes it possible that e.g. an error in a module comprising a control circuit and consumers will be able to switch off all modules connected by linking. It is particularly advantageous to effect this linking e.g. by a wired-or circuit and a pull-up resistor of the error signal $S_{stat}$.

As error modi which have to be detected with particular preference, there are to be mentioned a) an "open error" wherein an interruption or significant restriction of the current flow through a consumer is detected, and b) a short circuit wherein a consumer is bypassed or has a massively lowered internal resistance.

An indicator of an "open error" can be e.g. an output current $I_3$, $I_4$ which is smaller than 10% or 20% or 30% or 40% or 50% of predefined desired value or expected value. In this regard, a value less than 30% has been found to be of particular advantage.

As an indicator of a short circuit, there can be used an output voltage $U_3$, $U_4$ which at least at one of the outputs 3, 4 of control circuit 10 is smaller than a predefined desired value. In case of a current supply for an LED chain, this desired value depends on the number of the LEDs. For instance, it can have a value of 0.5 V or 0.1 V or 1.5 V but also other values. Besides, in case of an LED circuit, it is reasonable if one of the resistors $R_3$, $R_4$ has a value of zero ohm or nearly zero ohm. This is to be interpreted to the effect that the resistor should have a value of less than 10 ohm or preferably less than 5 ohm or preferably less than 2 ohm or preferably less than 1 ohm or preferably less than 100 mOhm.

If now, with the aid of a component of control circuit 10, such an error is detected from an external site by means of signaling or by measurement or due to a deviation from a desired value or range of desired values or a predefined temporal development or development range of one of the above discussed parameters and/or one of the above described control values and/or a magnitude derived from these, a possible measure to be taken by an optional control within control circuit 10 resides in that the energy supply of at least one consumer 11 in form of the energy supplied by the control circuit 10 to this consumer will be reduced or interrupted.

A special form of self-diagnosis of the apparatus can be performed in that one of the current paths, e.g. the second connector 4 of control circuit 10 will not be supplied with current and the voltage in this path, in this example the second output voltage $U_4$, will be measured. Thereby, the state of an LED chain acting as a consumer 11 can be detected in a more reliable manner. However, such a measurement process involves a disturbance of operation. Therefore, this measurement can be performed, if at all, only temporarily and typically only with a certain minimum time interval and e.g. periodically. Thus, a possible self-diagnosis in the form of error detection, at least for one possible error, will only be performed at specific times and not continuously.

Of course, it can be envisioned to use a plurality of control circuits 10 e.g. for RGB light control. For this purpose, for instance, three LED chains in the colors red, green and blue will be needed. In this exemplary variant, each of these LED chains is supplied with energy by a respective apparatus. To set the correct color, it is thus reasonable, for this purpose, to combine this triple control circuit with a color sensor MF. The latter will typically supply three actual values by which the respective current sums $I_{sum\_r}$, $I_{sum\_g}$ and $I_{sum\_b}$ will be readjusted. Then, as an external desired value, three values can be predefined which, depending on the respective color model, will be converted by a computer into the desired values $I_{sum\_r}$, $I_{sum\_g}$ and $I_{sum\_b}$. Of course, the desired values can also be predefined directly by an external circuit and/or by programming. Such an external circuit can be performed e.g. by reference currents $I_{ref\_ext\_1}$, $I_{ref\_ext\_2}$, $I_{ref\_ext\_3}$ which are programmed by external resistors $R_{ref\_1}$, $R_{ref\_2}$, $R_{ref\_3}$.

At this point, it should finally be mentioned that, in case of a suitable design of the external resistors $R_3$, $R_4$, $R_{4\_1}$, $R_{4\_2}$, $R_{4\_3}$, $R_{4\_8}$, operating temperatures can be allowed with this resistor that are far above the operating temperatures that are allowed for semiconductors and thus for a realization of the control circuit 10 as an integrated circuit.

Further, the external resistor $R_3$, $R_4$, $R_{4\_1}$, $R_{4\_2}$, $R_{4\_3}$, $R_{4\_8}$ can be mounted at a site different from the site of control circuit 10. This makes it possible, for instance, by suitable thermal insulation between the external resistor $R_3$, $R_4$, $R_{4\_1}$, $R_{4\_2}$, $R_{4\_3}$, $R_{4\_8}$ and the control circuit 10, to protect the circuit from a too high temperature load. As a resistor, there is then used a kind of electronic cooling body with respect to the system. Thus, it is a feature of a corresponding example that an external resistor $R_{ref\_1}$, $R_{ref\_2}$, $R_{ref\_3}$ is mounted at such a spatial distance or is thermally insulated in some other manner from control circuit 10 that, when the maximum specified operating temperature $T_R$ of the respective external resistor $R_3$, $R_4$, $R_8$, $R_{4\_1}$, $R_{4\_2}$, $R_{4\_3}$ is reached, the temperature of control circuit 10 will be increased in the best case by not more than 10° C., or less favorably by not more than 20° C., or less favorably by not more than 40° C., or less favorably by not more than 80° C.

On the other hand, cooling is particularly effective if the temperature difference between the external resistor and its cooling means, e.g. a coolant or a cooling body, is maximized. This can be performed by maximizing the allowable operating temperature of the external resistor. Thus, it is a feature of one example of the apparatus that, in an operating range of control circuit 10 confirming with the specification, an external resistor $R_3$, $R_4$, $R_8$, $R_{4\_1}$, $R_{4\_2}$, $R_{4\_3}$ has a temperature $T_R$ higher than 150° C. or better higher than 200° C. or better higher than 250° C. or better higher than 350° C. or better higher than 450° C. In this regard, it is e.g. conceivable to perform the cooling by liquid metal, i.e. for example lead or tin. In this case, also the melting heat can be used if the stresses only have a short duration. Thus, the apparatus is capable of successfully controlling very high peak loads, which marks a significant difference between this apparatus and the state of the art.

The apparatus further comprises one or a plurality of features from the groups of features listed hereunder, or one or a plurality of the groups of features listed hereunder:

1. An apparatus for controlled supply of electrical energy to a consumer 11 by a control circuit 10, wherein
   the control circuit 10 comprises at least four connectors 1, 2, 3, 4, 8,
   the consumer 11 comprises at least two supply connectors 5, 6,
   the control circuit 10, at least via at least two of its connectors 1, 2, is supplied with electrical energy from a controlled or uncontrolled energy source 7,
   at least one output 3, 4, 8 of the control circuit 10 is electrically connected, via an external resistor $R_3$, $R_4$, $R_8$, to at least one first connector 5 of the consumer 11,
   a further output 3, 4, 8 of the control circuit 10 is electrically connected, via an external resistor $R_3$, $R_4$, $R_8$ or directly, to said first connector 5 of the consumer 11,
   the consumer 11 is electrically connected, via at least one further second connector 6, to the energy source 7 or to a further connector 2 of the control circuit 10,
   in case that at least two second external resistors $R_3$, $R_4$, $R_8$ exist, these have different values,
   the sum of the output currents $I_3+I_4$, $I_3+I_4+I_8$ at the outputs 3, 4, 8 of the control circuit 10 corresponds to a sum current $I_3+I_4$, $I_3+I_4+I_8$ predefined as a desired value $I_{sum}$, and
   the distribution, with regard to the amount of the current, of sum of the output currents $I_3+I_4$, $I_3+I_4+I_8$ between the output currents $I_3+I_4+I_8$ of the outputs 3, 4, 8 of the control circuit 10 is dependent on at least one control parameter, i.e. distribution parameter $V_p$, that is detected in the control circuit 10 or is predefined from an external site via an analog or digital interface ST or another signal PWM.

2. The apparatus according to item 1, wherein the control circuit 10 comprises at least two current sources $IS_3$, $IS_4$, $IS_8$ supplying the output currents $I_3+I_4+I_8$.

3. The apparatus according to item 1 or 2, wherein the control circuit comprises at least one device $MI_3$, $MI_4$, $MI_8$ for at least temporarily measuring at least one output current $I_3+I_4+I_8$.

4. The apparatus according to any one or a plurality of items 1 to 3, wherein the control circuit comprises at least one device $MU_3$, $MU_4$, $MU_8$ for at least temporarily measuring at least one output voltage $U_3$, $U_4$, $U_8$ at one of the outputs 3, 4, 8 of the control circuit 10.

5. The apparatus according to any one or a plurality of items 1 to 4, wherein the control circuit comprises at least one device $MU_b$ for at least temporarily measuring at least one supply voltage $U_b$ of a control circuit 10.

6. The apparatus according to any one or a plurality of items 1 to 5, wherein the control circuit comprises at least one device $MP_3$, $MP_4$, $MP_8$ for at least temporarily measuring at least one output power $P_3$, $P_4$, $P_8$ at one of the outputs 3, 4 of the control circuit 10.

7. The apparatus according to any one or a plurality of items 1 to 6, wherein the control circuit 10 comprises at least one device for at least temporarily measuring at least one temperature T
   in the control circuit 10 itself and/or or
   in parts of the control circuit 10 and/or
   in the vicinity of the control circuit 10 and/or
   in the vicinity of at least one consumer 11 and/or
   in the vicinity of at least one external resistor $R_3$, $R_4$, $R_8$ and/or
   in a coolant or a cooling medium in the vicinity of a resistor $R_3$, $R_4$, $R_8$.

8. The apparatus according to any one or a plurality of items 3 to 7,
   wherein the apparatus comprises at least one component RG for comparing at least one of the measured values or a temporarily stored measurement value or a value derived therefrom to at least one associated desired value,
   wherein the comparison by the device RG is performed on the basis of whether said measured value is smaller than the desired value or larger than the desired value or optionally equal to the desired value, wherein "equal" means that the measured value is within a tolerance band around the desired value or that all values within this tolerance band are not evaluated as being larger or smaller,
   wherein at least one of the measurement values is
      one of the output currents $I_3$, $I_4$, $I_8$ or
      one of the output voltages $U_3$, $U_4$, $U_8$ or
      one of the output powers $P_3$, $P_4$, $P_8$ or
      the sum of all or a part of the output currents $I_3+I_4$, $I_3+I_4+I_8$ or
      the sum of all or a part of the output powers $P_3+P_4$, $P_3+P_4+P_8$ or
      the operating voltage $U_b$ made available by energy source 7 or
      the temperature T of control circuit 10 or
      the temperature T of a part of control circuit 10 or
      the temperature T in the vicinity of control circuit 10 or
      the temperature T in the vicinity of at least one consumer 11 or
      the temperature T in the vicinity of at least one external resistor $R_3$, $R_4$, $R_8$ or
      the temperature T in a coolant or a cooling medium in the vicinity of a resistor $R_3$, $R_4$, $R_8$ or
      a temporarily stored value of these values or
      a magnitude derived from these values and/or from their temporarily stored values.

9. The apparatus according to any one or a plurality of items 1 to 8, wherein at least one distribution parameter $V_p$ is
   one of the output currents $I_3$, $I_4$, $I_8$ or
   one of the output voltages $U_3$, $U_4$, $U_8$ or
   one of the output powers $P_3$, $P_4$, $P_8$ or
   the sum of all or a part of the output currents $I_3+I_4$, $I_3+I_4+I_8$ or
   the sum of all or a part of the output powers $P_3+P_4$, $P_3+P_4+P_8$ or
   the operating voltage $U_b$ of the control circuit 10 or
   the temperature T of control circuit 10 or
   the temperature T of a part of control circuit 10 or
   the temperature T in the vicinity of control circuit 10 or
   the temperature T in the vicinity of at least one consumer 11 or
   the temperature T in the vicinity of at least one external resistor $R_3$, $R_4$, $R_8$ or
   the temperature T in a coolant or a cooling medium in the vicinity of a resistor $R_3$, $R_4$, $R_8$ or
   a temporarily stored value of the above values or
   a magnitude derived from these values or
   a magnitude derived from the temporarily stored values of the above values.

10. The apparatus according to any one or a plurality of items 1 to 9, wherein
    the sum of at least two output currents $I_3+I_4$, $I_3$, $+I_4$, $+I_8$ is dependent on
       at least one of the output voltages $U_3$, $U_4$, $U_8$ and/or
       at least one of the output powers $P_3$, $P_4$, $P_8$ or
       the sum of all or a part of the output powers $P_3+P_4$, $P_3+P_4+P_8$ and/or
       the operating voltage $U_b$ made available by energy source 7 and/or
       the temperature T of control circuit 10 and/or
       the temperature T of a part of control circuit 10 and/or
       the temperature T in the vicinity of control circuit 10 and/or
       the temperature T in the vicinity of at least one consumer 11 and/or
       the temperature T in the vicinity of at least one external resistor $R_3$, $R_4$, $R_8$ and/or
       the temperature T in a coolant or a cooling medium in the vicinity of a resistor $R_3$, $R_4$, $R_8$ and/or
       a temporarily stored value of the above values and/or
       a magnitude derived from these values and/or
       a magnitude derived from the temporarily stored values of the above values.

11. The apparatus according to any one or a plurality of items 1 to 10 and according to item 8, wherein
    at least one of said components FD of item 8 has the function of error monitoring and emits at least one error signal $S_{stat}$ or emits said signal upon request,
    the error signal $S_{stat}$ can signal an error.

12. The apparatus according to any one or a plurality of items 1 to 11 and according to item 11, wherein
    at least one of said components FD of item 11 can be linked to the error signal $S_{stat\_ext}$ of a further apparatus in accordance with the invention or of a further apparatus not in accordance with the invention, so that the apparatus emits the error signal $S_{stat\_ext}$ of the further apparatus as an error by means of the error signal $S_{stat}$.

13. The apparatus according to item 12, wherein the linking is performed by a "wired-or" connection.

14. The apparatus according to any one or a plurality of items 11 to 13, wherein at least one of the detected errors is an "open error" or a short circuit.

15. The apparatus according to item 14, wherein
    an "open error" is detected when there is detected at least one output current $I_3$, $I_4$ which is smaller than 10% or 20% or 30% or 40% or 50% of desired value or expected value, or
    a short circuit is detected when the output voltage $U_3$, $U_4$, $U_8$ at least at one of the outputs 3, 4 of control circuit 10 is smaller than a desired value.

16. The apparatus according to item 15, wherein
    a short circuit is detected when at least one output voltage $U_3$, $U_4$, $U_8$ at least at one of the outputs 3, 4 of control circuit 10 is smaller than 0.5 or 0.1 V or 1.5 V and
    at least one of the consumers is an LED or an interconnection of LEDs, and
    one of the outputs 3, 4, 8 of the control circuit 10 is directly connected to a first connector 5 of the consumer 11.

17. The apparatus according to any one or a plurality of items 11 to 16, wherein, in case of an error, the energy supply of at least one consumer in form of the energy supplied by the control circuit to this consumer is reduced or interrupted.

18. The apparatus according to any one or a plurality of items 11 to 17, wherein a self-diagnosis in the form of error detection by at least one component FD at least for one possible error, is only performed at specific times and not continuously.

19. The apparatus according to any one or a plurality of items 1 to 18, wherein
    at least one consumer 11 is
        an LED or
        at least partially a serial connection of LEDs 11, 11_1, 11_2, 11_3 or
        at least partially a parallel connection of LEDs.

20. The apparatus according to any one or a plurality of items 1 to 19, wherein
    at least one output current $I_4$, $I_8$ of an output 4, 8 of the control circuit 10 is dependent on the operating voltage $U_b$, wherein also operating voltage ranges D are comprised in which no correct function is performed anymore, and
    this output current $I_4$, $I_8$ is constant in at least one operating voltage range C, C1, C2.

21. The apparatus according to any one or a plurality of items 1 to 20, wherein
    at least one current sum $I_3+I_4$ of at least two output currents $I_4$, $I_3$ of two associated outputs 3, 4 of the control circuit 10 is dependent on the operating voltage $U_b$, wherein also operating voltage ranges D are comprised in which no correct function is performed anymore, and
    this current sum $I_3+I_4$, $I_3+I_4+I_8$ and/or the consumer power loss $P_{LED}$ are constant in at least one operating voltage range B, C, C1, C2, and
    at least one of the currents $I_4$ in at least one of the voltage ranges B is not constant in which the current sum $I_3+I_4$, $I_3+I_4+I_8$ and/or the consumer power loss $P_{LED}$ is constant.

22. An apparatus for controlled supply of electrical energy to at least two consumers 11_1, 11_2,
    wherein the apparatus comprises at least two control circuits 10_1, 10_2 according to one or a plurality of items 1 to 21, and
    wherein at least a part of these at least two control circuits 10_1, 10_2 respectively supplies electrical energy to at least one of the consumers 11_1, 11_2, and
    wherein this respective consumer 11_1, 11_2 is not also supplied with energy by any one of the other control circuits 10_1, 10_2.

23. The apparatus according to item 22, wherein the reference currents $I_{ref\_ext}$ for the current sources of at least two of the control circuits 10_1, 10_2 of the apparatus can be set by a respective external reference signal or by programming.

24. An apparatus comprising at least two or three partial apparatuses 10_1, 10_2, 10_3 according to any one or a plurality of items 1 to 23,
    wherein each partial apparatus supplies electrical energy to a respective LED chain 11_1, 11_2, 11_3 or a respective other interconnection of light-generating components, and
    wherein the LED chains 11_1, 11_2, 11_3 or other interconnections of light-generating components together illuminate at least one spatial area, and
    wherein the LED chains 11_1, 11_2, 11_3 or other interconnections of light-generating components each irradiate light in a different color or centroid wavelength, and
    wherein the apparatus comprises at least one color sensor MF, and
    wherein at least this color sensor MF delivers at least one measurement value for the color of at least a part of the light irradiated back from the illuminated area and/or of the light of the LED chains or of the other said light-generating components, and
    wherein the respective sum currents $I_3+I_4$ of the respective partial apparatuses are set in dependence on said at least one measurement value of the color sensor MF and at least one associated desired value.

25. The apparatus according to any one or a plurality of items 1 to 24,
    wherein at least one external resistor $R_3$, $R_4$, $R_8$, $R_{4\_1}$, $R_{4\_2}$, $R_{4\_3}$ is mounted at a spatial distance or is thermally insulated in some other manner from control circuit 10,
    so that, when the maximum specified operating temperature $T_R$ of the respective external resistor $R_3$, $R_4$, $R_8$, $R_{4\_1}$, $R_{4\_2}$, $R_{4\_3}$ is reached, the temperature of control circuit 10 is increased by not more than 10° C., or by not more than 20° C., or by not more than 40° C., or by not more than 80° C.

26. The apparatus according to any one or a plurality of items 1 to 25, wherein, in at least one operating range of control circuit 10 conformal with the specification, at least one external resistor $R_3$, $R_4$, $R_8$, $R_{4\_1}$, $R_{4\_2}$, $R_{4\_3}$ has a temperature $T_R$ higher than 150° C. or higher than 200° C. or higher than 250° C. or higher than 350° C. or higher than 450° C.

27. A control circuit 10 for use in an apparatus according to any one or a plurality of items 1 to 26,
    wherein the control circuit comprises at least two current sources $IS_3$, $IS_4$, $IS_8$, and
    the sum of the output currents $I_3+I_4$, $I_3+I_4+I_8$ at the outputs 3, 4, 8 of the control circuit 10 corresponds to a sum current $I_3+I_4$, $I_3+I_4+I_8$ predefined as a desired value $I_{sum}$, and the distribution, with regard to the amount of the current, of sum of the output currents $I_3+I_4$, $I_3+I_4+I_8$ between the output currents $I_3+I_4+I_8$ of the outputs 3, 4, 8 of the control circuit 10 is dependent on at least one control parameter, i.e. distribution parameter $V_p$, that is detected in the control circuit 10 or is predefined from an external site via an analog or digital interface ST or another signal PWM.

28. A method for controlled supply of electrical energy to a consumer 11 by a control circuit 10, wherein the control circuit 10 comprises at least four connectors 1, 2, 3, 4, 8, the consumer 11 comprises at least two supply connectors 5, 6, the control circuit 10, at least via at least two of its connectors 1, 2, is supplied with electrical energy from a controlled or uncontrolled energy source 7, at least one output 3, 4, 8 of the control circuit 10 is electrically connected, via an external resistor $R_3$, $R_4$, $R_8$, to at least one first connector 5 of the consumer 11, a further output 3, 4, 8 of the control circuit 10 is electrically connected, via an external resistor $R_3$, $R_4$, $R_8$ or directly, to said first connector 5 of the consumer 11, the consumer 11 is electrically connected, via at least one further second connector 6, to the energy source 7 or to a further connector 2 of the control circuit 10, in case that at least two second external resistors $R_3$, $R_4$, $R_8$ exist, these have different values, the sum of the output currents $I_3+I_4$, $I_3+I_4+I_8$ at the outputs 3, 4, 8 of the control circuit 10 corresponds to a sum current $I_3+I_4$, $I_3+I_4+I_8$ predefined as a desired value $I_{sum}$, and the distribution, with regard to the amount of the current, of sum of the output currents $I_3+I_4$, $I_3+I_4+I_8$ between the output currents $I_3+I_4+I_8$ of the outputs 3, 4, 8 of the control circuit 10 is dependent on at least one control parameter, i.e. distribution parameter $V_p$, that is detected in the control circuit 10 or is predefined from an external site via an analog or digital interface ST or another signal PWM.

29. The method according to item 24, wherein the control is performed with the aid of at least two real current sources with finite internal resistances, said current sources supplying the output currents $I_3+I_4+I_8$.

30. The method according to item 24 or 29, wherein at least temporarily at least one output current $I_3+I_4+I_8$ is measured.

31. The method according to any one or a plurality of items 24 to 30, wherein at least one output voltage $U_3$, $U_4$, $U_8$ is at least temporarily measured at one of the outputs 3, 4, 8 of the control circuit 10.

32. The method according to any one or a plurality of items 24 to 31, wherein at least one supply voltage $U_b$ of a control circuit 10 is measured.

33. The method according to any one or a plurality of items 24 to 32, wherein at least one output power $P_3$, $P_4$, $P_8$ is at least temporarily measured at one of the outputs 3, 4, 8 of the control circuit 10.

34. The method according to any one or a plurality of items 24 to 33, wherein at least one temperature T is at least temporarily measured in the control circuit 10 itself and/or or in parts of the control circuit 10 and/or in the vicinity of the control circuit 10 and/or in the vicinity of at least one consumer 11 and/or in the vicinity of an external resistor $R_3$, $R_4$, $R_8$ and/or in a coolant or a cooling medium in the vicinity of a resistor $R_3$, $R_4$, $R_8$.

35. The method according to any one or a plurality of items 30 to 34, wherein at least one of the measured values or at least one of the temporarily stored values or at least one value derived therefrom (said values) is compared to at least one desired value, wherein the comparison is performed on the basis of whether said value is smaller than the desired value or larger than the desired value or optionally equal to the desired value, wherein "equal" means that the said value is within a tolerance band around the desired value and that a said value within this tolerance band is not evaluated as being larger or smaller, wherein at least one of the said values is one of the output currents $I_3$, $I_4$, $I_8$ or one of the output voltages $U_3$, $U_4$, $U_8$ or one of the output powers $P_3$, $P_4$, $P_8$ or the sum of all or a part of the output currents $I_3+I_4$, $I_3+I_4+I_8$ or the sum of all or a part of the output powers $P_3+P_4$, $P_3+P_4+P_8$ or the operating voltage $U_b$ made available by energy source 7 or the temperature T of control circuit 10 or the temperature T of a part of control circuit 10 or the temperature T in the vicinity of control circuit 10 or the temperature T in the vicinity of at least one consumer 11 or the temperature T in the vicinity of at least one external resistor $R_3$, $R_4$, $R_8$ or the temperature T in a coolant or a cooling medium in the vicinity of a resistor $R_3$, $R_4$, $R_8$ or a temporarily stored value of these values or a magnitude derived from these values and/or from their temporarily stored values.

36. The method according to any one or a plurality of items 24 to 35, wherein at least one distribution parameter $V_p$ is one of the output currents $I_3$, $I_4$, $I_8$ or one of the output voltages $U_3$, $U_4$, $U_8$ or one of the output powers $P_3$, $P_4$, $P_8$ or the sum of all or a part of the output currents $I_3+I_4$, $I_3+I_4+I_8$ or the sum of all or a part of the output powers $P_3+P_4$, $P_3+P_4+P_8$ or the operating voltage $U_b$ made available by the energy source 7 or the temperature T of control circuit 10 or the temperature T of a part of control circuit 10 or the temperature T in the vicinity of control circuit 10 or the temperature T in the vicinity of at least one consumer 11 or the temperature T in the vicinity of at least one external resistor $R_3$, $R_4$, $R_8$ or the temperature T in a coolant or a cooling medium in the vicinity of a resistor $R_3$, $R_4$, $R_8$ or a temporarily stored value of the above values or a magnitude derived from these values or a magnitude derived from the temporarily stored values of the above values.

37. The method according to any one or a plurality of items 24 to 36, wherein the sum of at least two output currents $I_3+I_4$, $I_3$, $+I_4$, $+I_8$ is dependent on at least one of the output voltages $U_3$, $U_4$, $U_8$ and/or at least one of the output powers $P_3$, $P_4$, $P_8$ or the sum of all or a part of the output powers $P_3+P_4$, $P_3+P_4+P_8$ and/or the operating voltage $U_b$ made available by energy source 7 and/or the temperature T of control circuit 10 and/or the temperature T of a part of control circuit 10 and/or the temperature T in the vicinity of control circuit 10 and/or the temperature T in the vicinity of at least one consumer 11 and/or the temperature T in the vicinity of at least one external resistor $R_3$, $R_4$, $R_8$ and/or the temperature T in a coolant or a cooling medium in the vicinity of a resistor $R_3$, $R_4$, $R_8$ and/or a temporarily stored value of the above values and/or a magnitude derived from these values and/or a magnitude derived from the temporarily stored values of the above values.

38. The method according to any one or a plurality of items 24 to 37 and according to item 35, wherein by the comparison of a measurement value with a desired value according to item 35, error monitoring and/or error detection are performed, and wherein at least one error signal $S_{stat}$ is generated that serves for signaling an error when the error is detected by said comparison.

39. The method according to any one or a plurality of items 24 to 38 and according to item 38, wherein at least one external error signal $S_{stat\_ext}$ is received and an error signal $S_{stat}$ serving for signaling an error is generated, i.e. an error is signaled, even when at least one received external error signal $S_{stat\_ext}$ signals another error.

40. The method according to any one or a plurality of items 38 to 39, wherein at least one of the detected errors is an "open error" or a short circuit.

41. The method according to item 40, wherein an "open error" is detected when there is detected at least one output current $I_3$, $I_4$, $I_8$ which is smaller than 10% or 20% or 30% or 40% or 50% of desired value or expected value, or a short circuit is detected when at least one measured output voltage $U_3$, $U_4$ $U_8$ is smaller than a desired value.

42. The method according to item 41, wherein a short circuit is detected when at least one output voltage $U_3$, $U_4$, $U_8$ is smaller than 0.5 or 0.1 V or 1.5 V.

43. The method according to any one or a plurality of items 38 to 42, wherein, in case of an error, the energy supply of at least one consumer in form of the energy supplied by the control circuit to this consumer is reduced or interrupted.

44. The method according to any one or a plurality of items 38 to 43, wherein a self-diagnosis in the form of error detection at least for one possible error is only performed at specific times and not continuously.

45. The method according to any one or a plurality of items 24 to 44, wherein at least one output current $I_4$ is controlled to be constant in at least one operating voltage range C.

46. The method according to any one or a plurality of items 24 to 45, wherein at least one current sum $I_3+I_4$, $I_3+I_4+I_8$ of at least two output currents $I_4$, $I_3$, $I_8$ is maintained constant in at least one operating voltage range B, C, C1, C2, at least one of the currents $I_4$ in at least one of the operating voltage ranges B is not controlled to be constant in which said current sum $I_3+I_4$, $I_3+I_4+I_8$ of at least two output currents $I_3+I_4+I_8$ is maintained constant, wherein the latter operating voltage range B is a part of the first mentioned operating voltage range B, C, C1, C2 or is equal to it.

47. A method for controlled supply of electrical energy to at least two consumers 11_1, 11_2, 11_3, wherein at least a part of these consumers 11_1, 11_2, 11_3 are supplied with electrical energy respectively by means of a method according to any one or a plurality of items 24 to 46.

48. The method according to item 47, wherein at least two output currents $I_3+I_4+I_8$ are set by a respective external reference signal $I_{ref\_ext\_1}$, $I_{ref\_ext\_2}$, $I_{ref\_ext\_3}$ or by programming.

The invention claimed is:

1. An apparatus for supplying at least one of electrical energy and electrical power for at least one consumer comprising:
 a control circuit implemented as an integrated circuit comprising:
  an input configured to receive electrical energy;
  at least two outputs including a first and second output controlled by the control circuit, each of the at least two outputs configured to supply one of electrical energy and electrical power to a consumer;
  at least one resistor arranged outside of the integrated circuit, the at least one resistor including a first resistor connected between the second output and the consumer, the first resistor connected to the consumer at a connecting point between the first resistor and the consumer;
  the first output connected directly to the consumer at the connecting point between the first resistor and the consumer;
  wherein the control circuit is programmed to:
   supply to the consumer, based on a specified value, an amount of electrical power; and
   distribute the at least one of the electrical energy and electrical power provided to the consumer between the first output and the second output based on a distribution parameter.

2. The apparatus of claim 1, wherein the control circuit is further programmed to do at least one of:
 receive the distribution parameter from an external source, and
 determine the distribution parameter based on data indicating a supply state of the apparatus.

3. The apparatus of claim 1, wherein the at least two outputs includes a third output, and the at least one resistor includes a second resistor arranged outside the integrated circuit, between the third output and the consumer.

4. The apparatus of claim 3, wherein a value of the first resistor is different from a value of the second resistor.

5. The apparatus of claim 1, wherein the control circuit comprises, for each output, a power provision and measurement module including:
 at least one of a controllable current source and a controllable voltage source; and
 a measurement unit programmed to detect at least one parameter representing at least one electrical value, the at least one electrical value including at least one of:
  an output current from one of the outputs of the control circuit;
  an output voltage from one of the outputs of the control circuit;

an output power from one of the outputs of the control circuit;
an operating voltage of the control circuit; and
an operating current of the control circuit.

6. The apparatus of claim 1, wherein the control circuit is programmed to provide to the consumer a sum of currents from the at least two outputs based on a specified sum current.

7. The apparatus of claim 1, further comprising a temperature sensor configured to measure a temperature of at least one of:
the control circuit;
a portion of the control circuit;
an area proximate to the control circuit;
the consumer;
an area proximate to the consumer;
one of the resistors;
an area proximate to one of the resistors; and
a coolant for one of the resistors.

8. The apparatus of claim 1, wherein the distribution parameter is based on at least one of:
an output current from one of the outputs of the control circuit;
an output voltage from one of the outputs of the control circuit;
an output power from one of the outputs of the control circuit;
a sum of at least two output currents from respective outputs of the control circuit;
a sum of at least two output powers from respective outputs of the control circuit;
an operating voltage of the control circuit;
a temperature of the control circuit;
a temperature of a portion of the control circuit;
a temperature proximate to the control circuit;
a temperature of the consumer;
a temperature of a portion of the consumer;
a temperature proximate to the consumer;
a temperature of one of the resistors;
a temperature proximate to one of the resistors;
a temperature for a coolant for one of the resistors
a temporarily stored value of at least one of:
  the output current from one of the outputs of the control circuit;
  the output voltage from one of the outputs of the control circuit;
  the output power from one of the outputs of the control circuit;
  the sum of at least two output currents from respective outputs of the control circuit;
  the sum of at least two output powers from respective outputs of the control circuit;
  the operating voltage of the control circuit;
  the temperature of the control circuit;
  the temperature of a portion of the control circuit;
  the temperature proximate to the control circuit;
  the temperature of the consumer;
  the temperature of a portion of the consumer;
  the temperature proximate to the consumer;
  the temperature of one of the resistors;
  the temperature proximate to one of the resistors; and
  the temperature for a coolant for one of the resistors;
a value derived from at least one of:
  the output current from one of the outputs of the control circuit;
  the output voltage from one of the outputs of the control circuit;
  the output power from one of the outputs of the control circuit;
  the sum of at least two output currents from respective outputs of the control circuit;
  the sum of at least two output powers from respective outputs of the control circuit;
  the operating voltage of the control circuit;
  the temperature of the control circuit;
  the temperature of a portion of the control circuit;
  the temperature proximate to the control circuit;
  the temperature of the consumer;
  the temperature of a portion of the consumer;
  the temperature proximate to the consumer;
  the temperature of one of the resistors;
  the temperature proximate to one of the resistors; and
  the temperature for a coolant for one of the resistors; and
a value derived from intermediate storage of at least one of;
  the output current from one of the outputs of the control circuit;
  the output voltage from one of the outputs of the control circuit;
  the output power from one of the outputs of the control circuit;
  the sum of at least two output currents from respective outputs of the control circuit;
  the sum of at least two output powers from respective outputs of the control circuit;
  the operating voltage of the control circuit;
  the temperature of the control circuit;
  the temperature of a portion of the control circuit;
  the temperature proximate to the control circuit;
  the temperature of the consumer;
  the temperature of a portion of the consumer;
  the temperature proximate to the consumer;
  the temperature of one of the resistors;
  the temperature proximate to one of the resistors; and
  the temperature for a coolant for one of the resistors.

9. The apparatus of claim 1, wherein the control circuit is programmed to determine the electrical power to supply to the consumer based on at least one of:
an output current from one of the outputs of the control circuit;
an output voltage from one of the outputs of the control circuit;
an output power from one of the outputs of the control circuit;
a sum of at least two output currents from respective outputs of the control circuit;
a sum of at least two output powers from respective outputs of the control circuit;
an operating voltage of the control circuit;
a temperature of the control circuit;
a temperature of a portion of the control circuit;
a temperature proximate to the control circuit;
a temperature of the consumer;
a temperature of a portion of the consumer;
a temperature proximate to the consumer;
a temperature of one of the resistors;
a temperature proximate to one of the resistors;
a temperature for a coolant for one of the resistors
a temporarily stored value of at least one of:
  the output current from one of the outputs of the control circuit;
  the output voltage from one of the outputs of the control circuit;

the output power from one of the outputs of the control circuit;
the sum of at least two output currents from respective outputs of the control circuit;
the sum of at least two output powers from respective outputs of the control circuit;
the operating voltage of the control circuit;
the temperature of the control circuit;
the temperature of a portion of the control circuit;
the temperature proximate to the control circuit;
the temperature of the consumer;
the temperature of a portion of the consumer;
the temperature proximate to the consumer;
the temperature of one of the resistors;
the temperature proximate to one of the resistors; and
the temperature for a coolant for one of the resistors;
a value derived from at least one of:
the output current from one of the outputs of the control circuit;
the output voltage from one of the outputs of the control circuit;
the output power from one of the outputs of the control circuit;
the sum of at least two output currents from respective outputs of the control circuit;
the sum of at least two output powers from respective outputs of the control circuit;
the operating voltage of the control circuit;
the temperature of the control circuit;
the temperature of a portion of the control circuit;
the temperature proximate to the control circuit;
the temperature of the consumer;
the temperature of a portion of the consumer;
the temperature proximate to the consumer;
the temperature of one of the resistors;
the temperature proximate to one of the resistors; and
the temperature for a coolant for one of the resistors; and
a value derived from intermediate storage of at least one of;
the output current from one of the outputs of the control circuit;
the output voltage from one of the outputs of the control circuit;
the output power from one of the outputs of the control circuit;
the sum of at least two output currents from respective outputs of the control circuit;
the sum of at least two output powers from respective outputs of the control circuit;
the operating voltage of the control circuit;
the temperature of the control circuit;
the temperature of a portion of the control circuit;
the temperature proximate to the control circuit;
the temperature of the consumer;
the temperature of a portion of the consumer;
the temperature proximate to the consumer;
the temperature of one of the resistors;
the temperature proximate to one of the resistors; and
the temperature for a coolant for one of the resistors.

10. The apparatus of claim 1, further comprising at least one component programmed to compare, to a predetermined range; at least one of:
an output current from one of the outputs of the control circuit;
an output voltage from one of the outputs of the control circuit;
an output power from one of the outputs of the control circuit;
a sum of at least two output currents from respective outputs of the control circuit;
a sum of at least two output powers from respective outputs of the control circuit;
an operating voltage of the control circuit;
a temperature of the control circuit;
a temperature of a portion of the control circuit;
a temperature proximate to the control circuit;
a temperature of the consumer;
a temperature of a portion of the consumer;
a temperature proximate to the consumer;
a temperature of one of the resistors;
a temperature proximate to one of the resistors;
a temperature for a coolant for one of the resistors
a temporarily stored value of at least one of:
the output current from one of the outputs of the control circuit;
the output voltage from one of the outputs of the control circuit;
the output power from one of the outputs of the control circuit;
the sum of at least two output currents from respective outputs of the control circuit;
the sum of at least two output powers from respective outputs of the control circuit;
the operating voltage of the control circuit;
the temperature of the control circuit;
the temperature of a portion of the control circuit;
the temperature proximate to the control circuit;
the temperature of the consumer;
the temperature of a portion of the consumer;
the temperature proximate to the consumer;
the temperature of one of the resistors;
the temperature proximate to one of the resistors; and
the temperature for a coolant for one of the resistors;
a value derived from at least one of:
the output current from one of the outputs of the control circuit;
the output voltage from one of the outputs of the control circuit;
the output power from one of the outputs of the control circuit;
the sum of at least two output currents from respective outputs of the control circuit;
the sum of at least two output powers from respective outputs of the control circuit;
the operating voltage of the control circuit;
the temperature of the control circuit;
the temperature of a portion of the control circuit;
the temperature proximate to the control circuit;
the temperature of the consumer;
the temperature of a portion of the consumer;
the temperature proximate to the consumer;
the temperature of one of the resistors;
the temperature proximate to one of the resistors; and
the temperature for a coolant for one of the resistors; and
a value derived from intermediate storage of at least one of;
the output current from one of the outputs of the control circuit;
the output voltage from one of the outputs of the control circuit;
the output power from one of the outputs of the control circuit;

the sum of at least two output currents from respective outputs of the control circuit;
the sum of at least two output powers from respective outputs of the control circuit;
the operating voltage of the control circuit;
the temperature of the control circuit;
the temperature of a portion of the control circuit;
the temperature proximate to the control circuit;
the temperature of the consumer;
the temperature of a portion of the consumer;
the temperature proximate to the consumer;
the temperature of one of the resistors;
the temperature proximate to one of the resistors; and
the temperature for a coolant for one of the resistors.

11. The apparatus of claim 10, at least one of the components is programmed to:
monitor at least one of a short circuit and a connection interruption on one of the control circuit outputs; and
provide a first signal indicating detection of a first error.

12. The apparatus of claim 11, wherein the at least one of the components is further programmed to:
receive, from another apparatus, an input indicating a second error of the other apparatus, and
output a second signal indicating detection of the second error.

13. The apparatus of claim 12, wherein the control circuit is further programmed to:
provide an output current at one of the outputs on the control circuit based on an operating voltage at the input to the control circuit; the output current being substantially constant for a range of the operating voltage.

14. The apparatus of claim 1, wherein the control circuit is further programmed to:
provide a first current at the first output and a second current at the second output, such that a sum of the first current and the second current is based on an operating voltage at the input to the control circuit, wherein:
at least one of the sum of the first current and the second current, and the power provided to the consumer, is constant in at least one range of the operating voltage; and
at least one of the first output current and the second output current is not constant in the range of the operating voltage.

15. The apparatus of claim 1, wherein at least one resistor is thermally decoupled from the control circuit in such a manner that a temperature of at least a portion of the control circuit does not rise by more than 80 degrees centigrade.

16. The apparatus of claim 1, wherein at least one of the resistors is configured to operate at a temperature greater than 150 degrees centigrade.

17. The apparatus of claim 1, wherein the consumer includes one of a light emitting diode, an array of light emitting diodes at least partially connected in series, and an array of light emitting diodes partially connected in parallel.

18. The apparatus of claim 1, wherein the one consumer includes at least one of an ohmic, inductive and capacitive load, as found in one of electronic devices for vehicles, electronic devices for residential application and electronic devices for industrial applications.

19. A method for an apparatus for supplying at least one of electrical energy and electrical power for at least one consumer from a vehicle electrical system, the method comprising:
supplying, to a consumer, by a control circuit implemented as an integrated circuit and comprising an input configured to receive electrical energy from the vehicle electrical system and at least two outputs including a first and second output controlled by the control circuit, each of the at least two outputs configured to supply one of electrical energy and electrical power to the consumer, an amount of electrical power; and
distributing the one of the electrical energy and electrical power provided to the consumer between the first output and the second output based on a distribution parameter, wherein the first output supplies the one of electrical energy and electrical power directly to a connecting point on the consumer and the second output supplies the one of electrical energy and electrical power to the connecting point on the consumer via a resistor external to the integrated circuit and connected to the connecting point.

20. The method of claim 19, further comprising at least one of:
receiving the distribution parameter from an external source, and
determining the distribution parameter based on data indicating an operating state of the apparatus.

* * * * *